United States Patent
Hepworth et al.

(10) Patent No.: US 7,428,981 B2
(45) Date of Patent: Sep. 30, 2008

(54) SYSTEM AND METHOD FOR ENCODING AND DECODING DATA AND REFERENCES TO DATA IN MACHINE-READABLE GRAPHICAL CODES

(75) Inventors: Paul J. Hepworth, Riverton, UT (US); Dimitri V. Yatsenko, Sandy, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 11/209,909

(22) Filed: Aug. 23, 2005

(65) Prior Publication Data

US 2006/0032920 A1    Feb. 16, 2006

Related U.S. Application Data

(62) Division of application No. 10/121,347, filed on Apr. 12, 2002, now Pat. No. 6,957,769.

(60) Provisional application No. 60/283,681, filed on Apr. 13, 2001.

(51) Int. Cl.
*G06F 17/00* (2006.01)
(52) U.S. Cl. .................................. 235/375; 235/462.01
(58) Field of Classification Search ............ 235/462.25, 235/375, 462.01, 494, 487; 705/23
See application file for complete search history.

(56) References Cited

U.S. PATENT DOCUMENTS

| | | | |
|---|---|---|---|
| 3,513,320 A | 5/1970 | Weldon | |
| 4,488,679 A | 12/1984 | Bockholt et al. | |
| 4,654,718 A | 3/1987 | Sueyoshi | |
| 4,752,675 A | 6/1988 | Zetmeir | |
| 4,896,029 A | 1/1990 | Chandler et al. | |
| 4,958,064 A | 9/1990 | Kirkpatrick | |
| 4,998,010 A | 3/1991 | Chandler et al. | |

(Continued)

FOREIGN PATENT DOCUMENTS

EP        0 837 406        4/1998

(Continued)

OTHER PUBLICATIONS

Symbol Technologies Inc., 1991, PDF 417 Specification by Ynjiun Wang.

(Continued)

*Primary Examiner*—Lisa Caputo
(74) *Attorney, Agent, or Firm*—Madson & Austin

(57) ABSTRACT

A system for decoding machine-readable graphical codes is provided. The system includes a graphical code reading device configured to read a graphical code and generate reference encoded source data. The reference encoded source data includes a first reference identifier and a second portion. The system also includes a computing device in electronic communication with the graphical code reading device. The computing device also includes a reference decoder configured to effect conversion of the reference encoded source data into source data. The source data includes first affiliated data in place of the first reference identifier. The first affiliated data may be longer in length than the first reference identifier. The source data also includes the second portion. The computing device also includes a software application configured to use the source data.

45 Claims, 21 Drawing Sheets

U.S. PATENT DOCUMENTS

| | | |
|---|---|---|
| 5,047,614 A | 9/1991 | Bianco |
| 5,113,445 A | 5/1992 | Wang |
| 5,153,418 A | 10/1992 | Batterman et al. |
| 5,159,635 A | 10/1992 | Wang |
| 5,189,292 A | 2/1993 | Batterman et al. |
| 5,223,701 A | 6/1993 | Batterman et al. |
| 5,343,028 A | 8/1994 | Figarella et al. |
| 5,352,878 A | 10/1994 | Smith et al. |
| 5,412,196 A | 5/1995 | Surka |
| 5,428,211 A | 6/1995 | Zheng et al. |
| 5,438,188 A | 8/1995 | Surka |
| 5,465,291 A | 11/1995 | Barrus et al. |
| 5,478,999 A | 12/1995 | Figarella et al. |
| 5,483,052 A | 1/1996 | Smith, III et al. |
| 5,493,105 A | 2/1996 | Desai |
| 5,545,887 A | 8/1996 | Smith et al. |
| 5,604,640 A | 2/1997 | Zipf et al. |
| 5,612,527 A | 3/1997 | Ovadia |
| 5,640,193 A * | 6/1997 | Wellner ............ 725/100 |
| 5,804,803 A | 9/1998 | Cragun et al. |
| 5,869,819 A | 2/1999 | Knowles et al. |
| 5,903,729 A | 5/1999 | Reber et al. |
| 5,905,248 A | 5/1999 | Russell et al. |
| 5,905,251 A | 5/1999 | Knowles |
| 5,933,634 A | 8/1999 | Enokido et al. |
| 5,933,829 A | 8/1999 | Durst et al. |
| 5,938,726 A | 8/1999 | Reber et al. |
| 5,938,727 A | 8/1999 | Ikeda |
| 5,978,773 A | 11/1999 | Hudetz et al. |
| 5,992,752 A | 11/1999 | Wilz, Sr. et al. |
| 6,012,102 A | 1/2000 | Shachar |
| 6,027,024 A | 2/2000 | Knowles |
| 6,032,195 A | 2/2000 | Reber et al. |
| 6,068,188 A | 5/2000 | Knowles |
| 6,076,733 A | 6/2000 | Wilz, Sr. et al. |
| 6,098,106 A | 8/2000 | Philyaw et al. |
| 6,108,656 A | 8/2000 | Durst et al. |
| 6,138,151 A | 10/2000 | Reber et al. |
| 6,154,738 A | 11/2000 | Call |
| 6,377,986 B1 | 4/2002 | Philyaw et al. |
| 6,384,744 B1 | 5/2002 | Philyaw et al. |
| 6,535,883 B1 | 3/2003 | Lee et al. |
| 6,564,249 B2 | 5/2003 | Shiigi |
| 6,584,601 B1 | 6/2003 | Kodosky et al. |
| 6,957,769 B2 | 10/2005 | Hepworth et al. |
| 2002/0147743 A1 | 10/2002 | Le et al. |

FOREIGN PATENT DOCUMENTS

| | | |
|---|---|---|
| WO | WO-98/03923 | 1/1998 |
| WO | WO-98/06055 | 2/1998 |
| WO | WO-98/24036 | 6/1998 |
| WO | WO-98/40823 | 9/1998 |
| WO | WO-98/49813 | 11/1998 |
| WO | WO-99/04326 | 1/1999 |

OTHER PUBLICATIONS

"Punched Cards to Bar Codes," Benjamin Nelson, Helmers Publishing, Inc. 1997, pp. 1-16.

"MiniCode," http://www.omniplanar.com/minicode.htm, pp. 1-10, May 17, 1999.

* cited by examiner

SYSTEM AND METHOD FOR ENCODING AND DECODING DATA AND REFERENCES TO DATA IN MACHINE-READABLE GRAPHICAL CODES

RELATED APPLICATIONS

This application is a divisional of U.S. patent application Ser. No. 10/121,347, filed Apr. 12, 2002 and now issued as U.S. Pat. No. 6,957,769, which is related to and claims priority from U.S. patent application Ser. No. 60/283,681 filed Apr. 13, 2001, for "System and Method for Encoding Data and References to Data in Machine-Readable Graphical Codes to Support Dynamic Modification and Access Control," with inventors Paul Hepworth and Dimitri Yatsenko, which are both incorporated herein by reference.

BACKGROUND OF THE INVENTION

1. Field of the Invention

The present invention relates generally to the field of graphical-code reading computer systems. More specifically, the present invention relates to systems and methods for encoding and decoding data and references to data in machine-readable graphical codes.

2. Description of Related Background Art

Computer technology has entered many areas to simplify manual tasks and to make information more readily available. Most people use several computer programs every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have. Typically, computer programs operate upon source data in order to help a user. Thus, the source data must somehow be input into the computer program.

One way to input source data into a computer program involves the use of machine-readable graphical codes, such as bar codes, matrix codes, etc. A graphical code is a graphical representation of source data. A user may scan the graphical code with a graphical code reading device, which converts the graphical code back into source data. Typically, the graphical code reading device is in electronic communication with a computer program. After the graphical code reading device converts the graphical code into source data, it typically sends the source data to the computer program. The computer program may then use the source data to accomplish one or more tasks.

The amount of source data that can be encoded directly into graphical codes is limited by the size of the supported characters in the code's symbology. For example, some codes can store only numbers, some codes can store only ASCII characters, and so forth. Thus, it would be beneficial if means were provided to enable more source data to be encoded into machine-readable graphical codes. It would also be beneficial if means were provided to facilitate decoding of such machine-readable graphical codes.

BRIEF DESCRIPTION OF THE DRAWINGS

Non-exhaustive embodiments of the invention are described with reference to the figures, in which.

DETAILED DESCRIPTION

Figure 1:
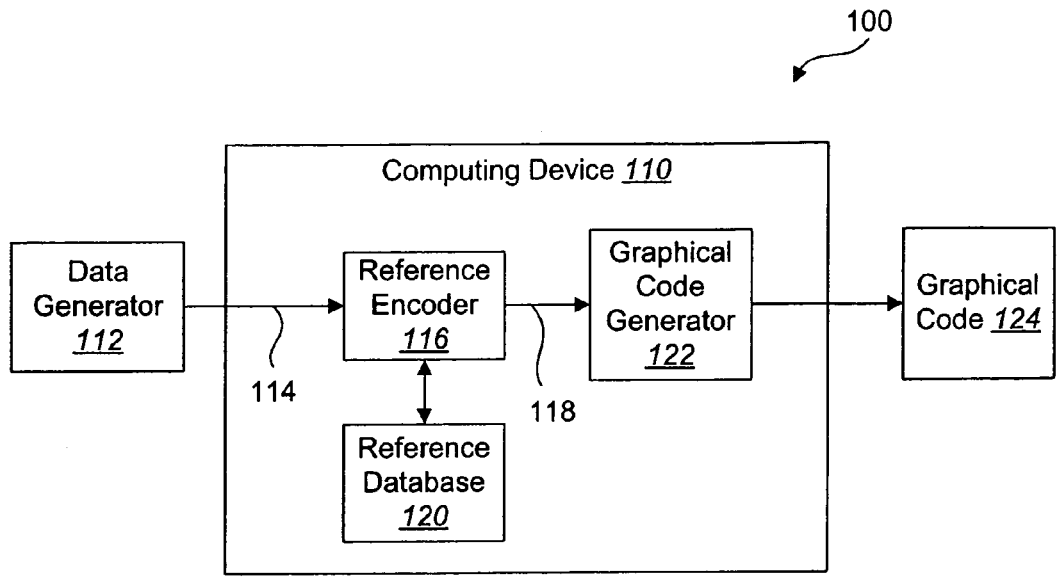
FIG. 1 is a block diagram of an embodiment of a system for encoding machine-readable graphical codes.

A method for encoding machine-readable graphical codes is provided. The method includes receiving source data. The source data includes a first portion and a second portion. The method also includes effecting conversion of the source data into reference encoded source data. The reference encoded source data includes a first reference identifier in place of the first portion. The first reference identifier may be shorter in length than the first portion. The reference encoded source data also includes the second portion. The method also includes sending the reference encoded source data to a graphical code generator that is configured to convert the reference encoded source data into a graphical code. In one embodiment, the first reference identifier does not include a terminating symbol.

Effecting conversion of the source data into reference encoded source data may include obtaining the first reference identifier and associating the first portion of the source data with the first reference identifier. Associating the first portion of the source data with the first reference identifier may involve storing the first portion of the source data and the first reference identifier in a reference database.

In one embodiment, obtaining the first reference identifier involves creating the first reference identifier. The first reference identifier may include a prefix and a suffix. In such an embodiment, creating the first reference identifier may involve locating a previously assigned reference identifier in the reference database. The previously assigned reference identifier may include the prefix and a previously assigned suffix. Creating the first reference identifier may also involve forming the suffix by incrementing the previously assigned suffix. In another embodiment, obtaining the first reference identifier may involve locating an expired reference identifier in the reference database. The expired reference identifier may include the prefix and the suffix.

A method for decoding machine-readable graphical codes is also provided. The method includes receiving reference encoded source data. The reference encoded source data includes a first reference identifier and a second portion. The method also includes effecting conversion of the reference encoded source data into source data. The source data includes first affiliated data in place of the first reference identifier. The first affiliated data may be longer in length than the first reference identifier. The source data also includes the second portion. The method also includes making the source data available to a software application. In one embodiment, the first reference identifier does not include a terminating symbol.

Effecting conversion of the reference encoded source data into source data may include locating a reference database that contains the first reference identifier and the first affiliated data, and retrieving the first affiliated data from the reference database.

The reference database may be stored on a server. In such an embodiment, locating the reference database may include establishing communication with the server over a network.

In one embodiment, the reference database may be stored on a first server and on a second server. In such an embodiment, locating the reference database may include attempting to establish communication with the first server over a network, and establishing communication with the second server over the network.

The first reference identifier and the first affiliated data may be stored in a first record in the reference database. In such an embodiment, retrieving the first affiliated data from the reference database may include downloading the first record from the server. The reference database may also include a second record. The second record may include a second reference identifier and second affiliated data. The second affiliated data may be associated with the second reference identifier. Retrieving the first affiliated data from the reference database may also include downloading the second record from the server.

The source data may include command data that may be recognized by the software application as a command to perform a task. In such an embodiment, the method may also include determining whether a user of the software application is authorized to effect performance of the task.

In one embodiment, the reference encoded source data may be a reference encoded URL, the source data may be a URL, and the software application may be a web browser. In such an embodiment, effecting conversion of the reference encoded URL into the URL may include sending the reference encoded URL to a dynamic web server as part of a file request. The method may also include receiving a web file from the dynamic web server. The web file or its header may include the URL and a redirect or refresh tag which causes the web browser to access a web page corresponding to the URL.

A system for encoding machine-readable graphical codes is also provided. The system includes a data generator configured to provide source data. The source data includes a first portion and a second portion. The system also includes a computing device in electronic communication with the data generator. The computing device includes a processor and a memory in electronic communication with the processor. The computing device also includes a reference encoder configured to effect conversion of the source data into reference encoded source data. The reference encoded source data includes a first reference identifier in place of the first portion. The first reference identifier may be shorter in length than the first portion. The reference encoded source data also includes the second portion. The computing device also includes a graphical code generator configured to convert the reference encoded source data into a graphical code. In one embodiment, the first reference identifier does not include a terminating symbol.

The reference encoder may effect conversion of the source data into reference encoded source data by obtaining the first reference identifier and associating the first portion of the source data with the first reference identifier. Associating the first portion of the source data with the first reference identifier may include storing the first portion of the source data and the first reference identifier in a reference database.

Obtaining the first reference identifier may include creating the first reference identifier. In one embodiment, the first reference identifier includes a prefix and a suffix. In such an embodiment, creating the first reference identifier may include locating a previously assigned reference identifier in the reference database. The previously assigned reference identifier may include the prefix and a previously assigned suffix. Creating the first reference identifier may also include forming the suffix by incrementing the previously assigned suffix. In another embodiment, obtaining the first reference identifier may include locating an expired reference identifier in the reference database. The expired reference identifier may include the prefix and the suffix.

A system for decoding machine-readable graphical codes is also provided. The system includes a graphical code reading device configured to read a graphical code and generate reference encoded source data. The reference encoded source data includes a first reference identifier and a second portion. The system also includes a computing device in electronic communication with the graphical code reading device. The computing device also includes a processor, a memory in electronic communication with the processor, and a communications port in electronic communication with the processor for communicating with the graphical code reading device.

The computing device also includes a reference decoder configured to effect conversion of the reference encoded source data into source data. The source data includes first affiliated data in place of the first reference identifier. The first affiliated data may be longer in length than the first reference identifier. The source data also includes the second portion. The computing device also includes a software application configured to use the source data. In one embodiment, the first reference identifier does not include a terminating symbol.

The reference decoder may effect conversion of the reference encoded source data into source data by locating a reference database that contains the first reference identifier and the first affiliated data, and retrieving the first affiliated data from the reference database.

The reference database may be stored on a server. In such an embodiment, locating the reference database may include establishing communication with the server over a network. In another embodiment, the reference database may be stored on a first server and on a second server. In such an embodiment, locating the reference database may include attempting to establish communication with the first server over a network, and establishing communication with the second server over the network.

The computing device may also include a cache in electronic communication with the reference decoder. The first reference identifier and the first affiliated data may be stored in a first record in the reference database. In such an embodiment, retrieving the first affiliated data from the reference database may include downloading the first record from the server and storing the first record in the cache. The reference database may also include a second record. The second record may include a second reference identifier and second affiliated data. The second affiliated data may be associated with the second reference identifier. Retrieving the first affiliated data from the reference database may also include downloading the second record from the server and storing the second record in the cache.

The source data may include command data that may be recognized by the software application as a command to perform a task. The computing device may also include an access control module configured to determine whether a user of the software application is authorized to effect performance of the task.

In one embodiment, the reference encoded source data may be a reference encoded URL, the source data may be a URL, and the software application may be a web browser. In such an embodiment, the reference decoder may effect conversion of the reference encoded URL into the URL by sending the reference encoded URL to the web browser. The web browser may be configured to send the reference encoded URL to a dynamic web server as part of a file request. The web browser may also be configured to receive a web file from the dynamic web server. The web file or its header may include the URL and a refresh or redirect tag which causes the web browser to access a web page corresponding to the URL.

FIG. 1 is a block diagram of an embodiment of a system 100 for encoding machine-readable graphical codes. The system 100 includes a computing device 110. The computing device 110 may be a personal computer, workstation, handheld computer, personal digital assistant, cell phone, game machine, microcontroller, server, mainframe, supercomputer, or any variation or related device thereof.

The system 100 also includes a data generator 112 in electronic communication with the computing device 110. The data generator 112 may be any type of device that is capable of providing source data 114 that may be utilized by the computing device 110. In FIG. 1, the data generator 112 is shown as being separate from the computing device 110. For example, the data generator 112 may be an input device (e.g., keyboard, mouse, microphone, etc.) that may be used to input the source data 114 into the computing device 110. Alternatively, the data generator 112 may be located within the computing device 110. For example, the data generator 112 may be a file containing the source data 114 that is stored within the computing device 110.

The computing device 110 may include a reference encoder 116 that is configured to receive the source data 114 and effect conversion of the source data 114 into reference encoded source data 118. In one embodiment, the source data 114 may include a first portion and a second portion. In such an embodiment, the reference encoded source data 118 may include a reference identifier in place of the first portion. The reference encoded source data 118 may also include the second portion. For example, the source data 114 may be a URL that includes a domain name and a file name. The reference encoded source data 118 may include a reference identifier in place of the domain name. The reference encoded source data 118 may also include the file name.

The computing device 110 may include a reference database 120 that is in electronic communication with the reference encoder 116. The reference database 120 includes information that may be used to effect conversion of the source data 114 into reference encoded source data 118. For example, in one embodiment, effecting conversion of the source data 114 into reference encoded source data 118 may involve creating new reference identifiers. In such an embodiment, the reference database 120 may store previously used reference identifiers, and the reference encoder 116 may examine the previously used reference identifiers in order to create new reference identifiers. After the reference encoder 116 has effected conversion of the source data 114 into reference encoded source data 118, the reference encoder 116 may update the information stored in the reference database 120.

The computing device 110 may also include a graphical code generator 122 that is in electronic communication with the reference encoder 116. The graphical code generator 122 is configured to convert the reference encoded source data 118 into a graphical code 124. The graphical code 124 may be a bar code, matrix code, or any other type of code that may be read by a graphical code reading device. Graphical code generators 122 are commercially available and known to those skilled in the art.

The system 100 may include functionality in addition to that explicitly shown in FIG. 1. For example, in one embodiment the system 100 may include a compression encoder configured to compress the source data 114 and/or the reference encoded source data 118. The compression encoder may operate according to any number of known techniques, such as Huffman encoding, multiple symbol encoding, etc.

Figure 2:
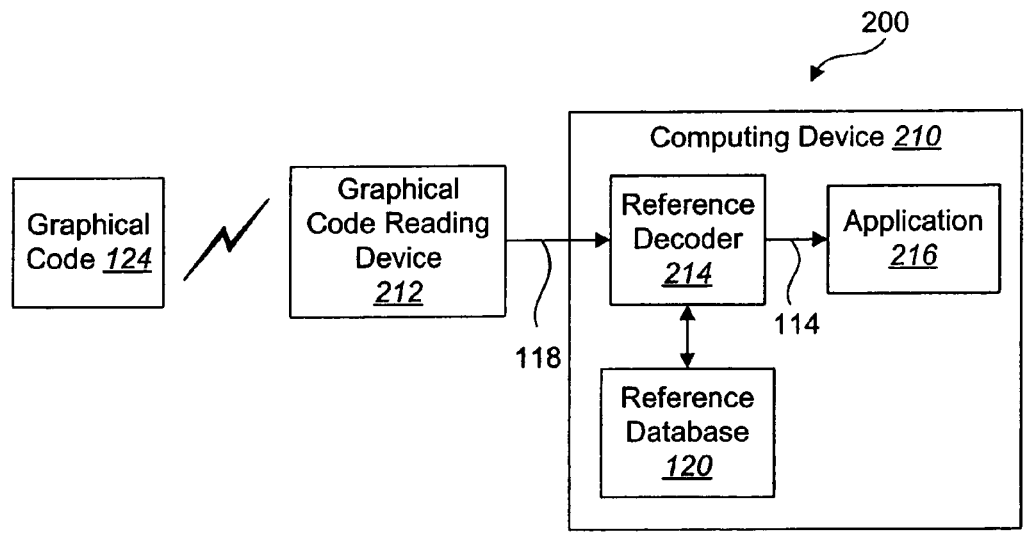
FIG. 2 is a block diagram of an embodiment of a system for decoding machine-readable graphical codes.

FIG. 2 is a block diagram of an embodiment of a system 200 for decoding machine-readable graphical codes. The system 200 shown in FIG. 2 may include a computing device 210. The computing device 210 may be the same computing device 110 that is shown in FIG. 1, or it may be a different computing device 210.

The system 200 may also include a graphical code reading device 212. The graphical code reading device 212 may be a bar code scanner, matrix code scanner, or any other device capable of reading the graphical code 124 and converting it into reference encoded source data 118. Graphical code reading devices 212 are commercially available and known to those skilled in the art.

The computing device 210 may include a reference decoder 214 that is configured to receive the reference encoded source data 118 and effect conversion of the reference encoded source data 118 back into the source data 114.

As stated previously, in one embodiment the source data 114 may include a first portion and a second portion, and the reference encoded source data 118 may include a reference identifier in place of the first portion. In such an embodiment, effecting conversion of the reference encoded source data 118 back into the source data 114 may involve replacing the reference identifier with the first portion of the source data 114. For example, as stated previously, the source data 114 may be a URL that includes a domain name and file name, and the reference encoded source data 118 may include a reference identifier in place of the domain name. In such an embodiment, effecting conversion of the reference encoded source data 118 back into the source data 114 may involve replacing the reference identifier with the domain name.

The computing device 210 may also include the reference database 120 in electronic communication with the reference decoder 214. The reference database 120 includes information that may be used to effect conversion of the reference encoded source data 118 back into the source data 114. In one embodiment the reference database 120 may include a list of reference identifiers and the data associated with those reference identifiers. In such an embodiment, effecting conversion of the reference encoded source data 118 back into the source data 114 may involve identifying a reference identifier in the reference encoded source data 118, looking up the data associated with that reference identifier in the reference database 120, and replacing the reference identifier with the associated data.

A software application 216 may be running on the computing device 210. The application 216 is in electronic communication with the reference decoder 214 and is configured to receive the source data 114 from the reference decoder 214. The application 216 may use the source data 114 to accomplish one or more tasks. For example, in one embodiment, the application 216 is a web browser and the source data 114 is a URL. The web browser may use the URL to access a web page corresponding to the URL.

The system 200 may include functionality in addition to that explicitly shown in FIG. 2. For example, in one embodiment the system 200 may include a compression decoder configured to decompress the reference encoded source data 118 and/or the source data 114. The compression decoder may operate according to any number of known techniques, such as Huffman decoding, multiple symbol decoding, etc.

Figure 3:
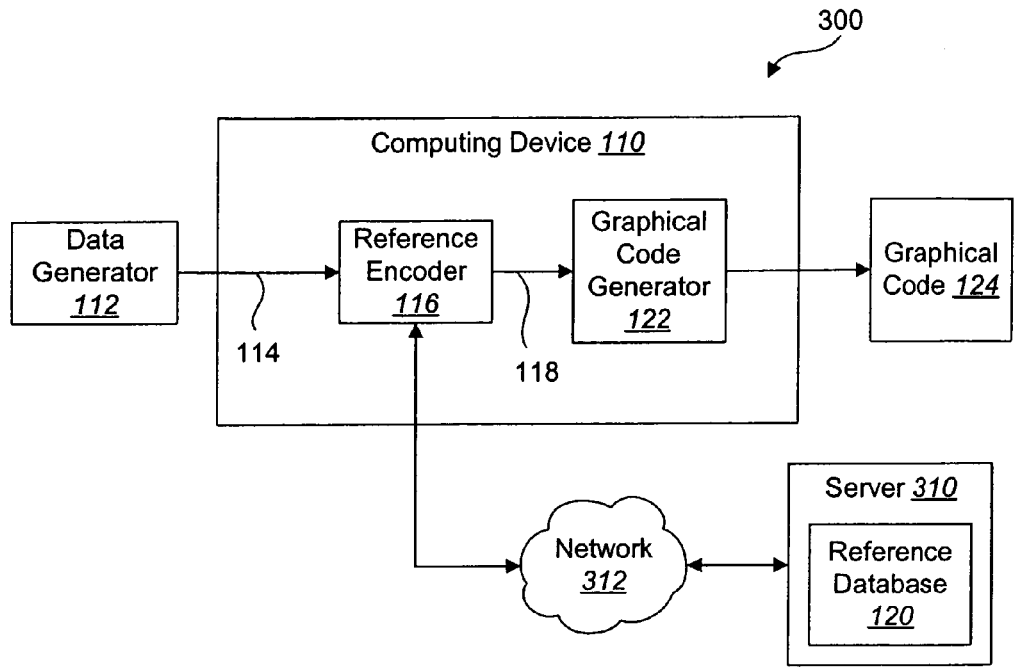
FIG. 3 is a block diagram of an alternative embodiment of a system for encoding machine-readable graphical codes.

FIG. 3 is a block diagram of an alternative embodiment of a system 300 for encoding machine-readable graphical codes.

The system shown in FIG. 3 is similar to the system 100 shown in FIG. 1 except for the following. In FIG. 3, the reference database 120 is located on a server 310 that is in electronic communication with the computing device 110 over a network 312. The network 312 may be the Internet, a wide area network (WAN), local area network (LAN), wireless network, etc.

Figure 4:
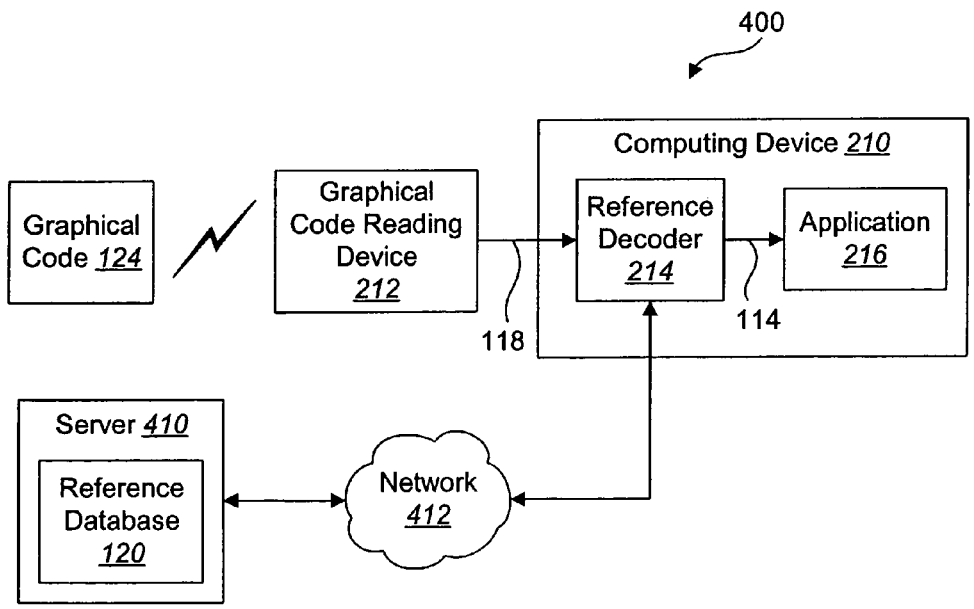
FIG. 4 is a block diagram of an alternative embodiment of a system for decoding machine-readable graphical codes.

FIG. 4 is a block diagram of an alternative embodiment of a system 400 for decoding machine-readable graphical codes. The system 400 shown in FIG. 4 is similar to the system 200 shown in FIG. 2 except for the following. In FIG. 4, the reference database 120 is located on a server 410 that is in electronic communication with the computing device 210 over a network 412. The server 410 may be the same server 310 that is shown in FIG. 3, or it may be a different server 410. Similarly, the network 412 may be the same network 312 that is shown in FIG. 3, or it may be a different network 412. As before, the network 412 may be the Internet, a wide area network (WAN), local area network (LAN), wireless network, etc.

Figure 5:
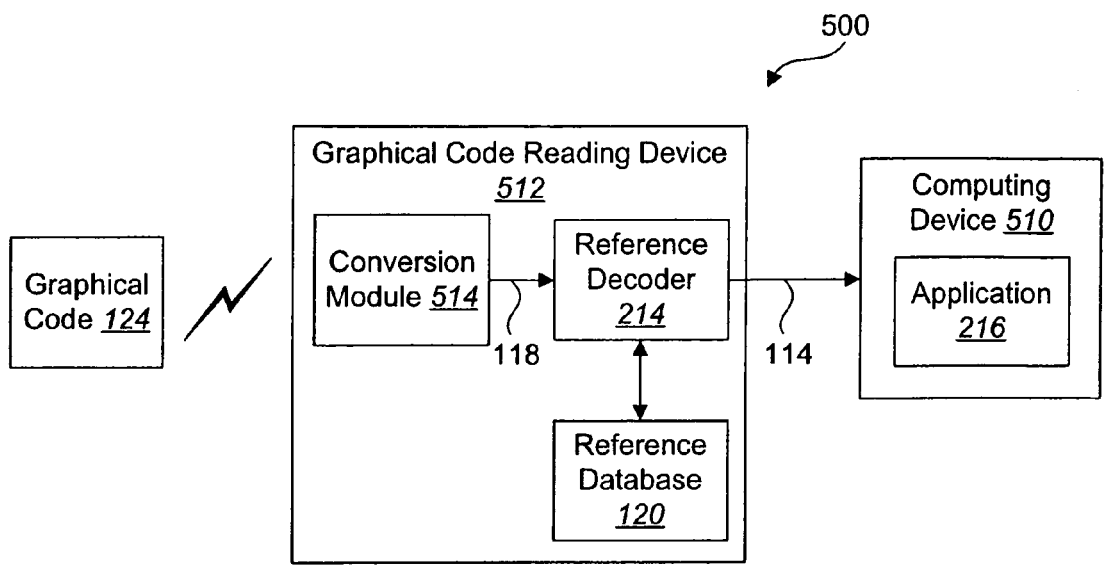
FIG. 5 is a block diagram of an alternative embodiment of a system for decoding machine-readable graphical codes.

FIG. 5 is a block diagram of an alternative embodiment of a system 500 for decoding machine-readable graphical codes. The system 500 shown in FIG. 5 is similar to the system 200 shown in FIG. 2 except for the following. In FIG. 5, the reference decoder 214 and the reference database 120 are contained within the graphical code reading device 512. The graphical code reading device 512 includes one or more graphical code conversion modules 514 configured to read the graphical code 124 and convert it 124 into reference encoded source data 118. The reference decoder 214 is in electronic communication with the graphical code conversion module 514 and receives the reference encoded source data 118 from the graphical code conversion module 514. The reference decoder 214 then converts the reference encoded source data 118 into source data 114, and sends the source data 114 to the computing device 510, where it 114 may be made available to the application 216.

In one embodiment, one or more reference identifiers may be reserved for use by the graphical code reading device 212, its driver, or the application 216 for performing substitution of dynamic data for the reference identifier 730 (rather than using normal lookup). That is, a graphical code 124 may include one or more reserved reference identifiers. When the graphical code 124 is read, the graphical code reading device 212, its driver, or the application 216 may replace the reserved reference identifiers with corresponding information known to the graphical code reading device 212.

For example, a graphical code 124 may include reference identifiers that instruct the graphical code reading device 212 to insert an identifier that identifies the graphical code reading device 212 and a screen resolution. In such an embodiment, when the application 216 receives the source data 114, the application 216 may then recognize the user according to the ID of his graphical code reading device 212. The application 216 may also present its content in a way optimized for his screen resolution.

Alternatively, a graphical code 124 may include a reference identifier that instructs the application 216 to insert an identifier that identifies the CD drive on the computing device 210. For example, the graphical code 124 may refer to <cd drive>\filename. When the application 216 receives the source data 114, it may still refer to <cd drive>\filename. The application 216 may then insert the CD drive (e.g., the D drive, E drive, etc.) in place of <cd drive>. The source data 114 would then refer to D:\filename (assuming the CD drive is the D drive).

Figure 6:
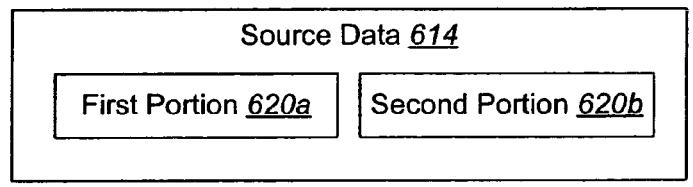
FIG. 6 is a block diagram of an embodiment of the source data.

FIG. 6 is a block diagram of an embodiment of the source data 614. In FIG. 6, the source data 614 includes a first portion 620a and a second portion 620b. As stated previously, in one embodiment the source data 614 may be a URL. In such an embodiment, the first portion 620a of the source data 614 may be a domain name and the second portion 620b of the source data 614 may be a file name.

Figure 7:
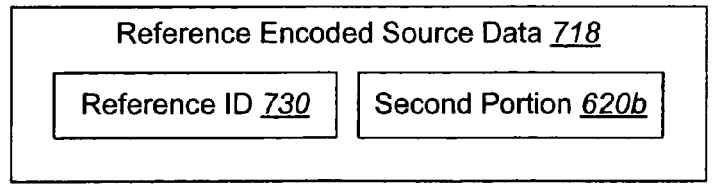
FIG. 7 is a block diagram of an embodiment of the reference encoded source data.

FIG. 7 is a block diagram of an embodiment of the reference encoded source data 718. The reference encoded source data 718 includes a reference identifier 730 in place of the first portion 620a of the source data 614 previously shown in FIG. 6. The reference encoded source data 718 also includes the second portion 620b of the source data 614 previously shown in FIG. 6.

Of course, the embodiments of the source data 614 and the reference encoded source data 718 shown in FIGS. 6-7 are exemplary only. In alternative embodiments, multiple reference identifiers 730 may be used to replace multiple portions 620 of the source data. In addition, reference identifiers 730 may replace one or more portions 620 at the beginning of the source data 614, in the middle of the source data 614, and/or at the end of the source data 614. Those skilled in the art will recognize numerous alternative configurations for the source data 614 and/or the reference encoded source data 718 in light of the teachings contained herein.

Figure 8:
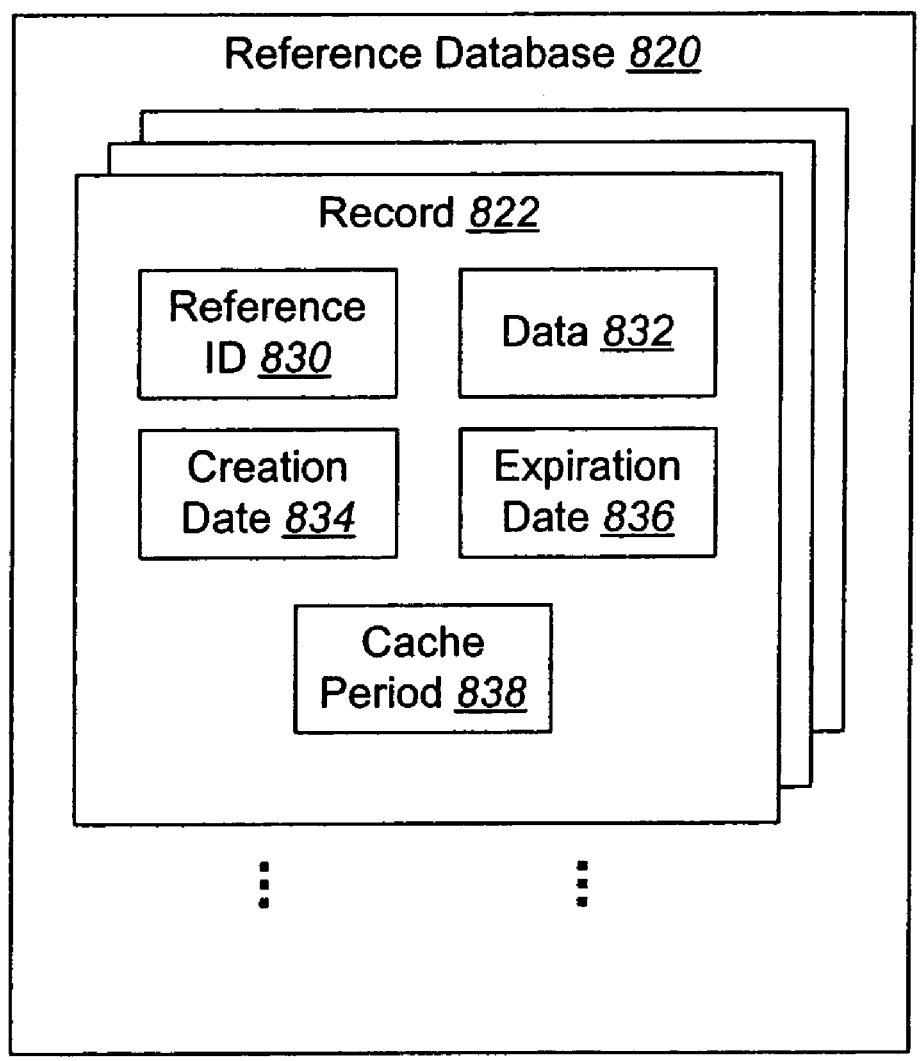
FIG. 8 is a block diagram of an embodiment of the reference database.

FIG. 8 is a block diagram of an embodiment of the reference database 820. The reference database 820 may include a plurality of records 822. Each record 822 may include a reference identifier 830 and data 832 that is associated with the reference identifier 830. In one embodiment, the data 832 is a portion 620 of source data 114 that may be replaced by the reference identifier 830 in order to create reference encoded source data 118.

Each record 822 may also include a creation date 834 and an expiration date 836. The creation date 834 may be the date that the record 822 is created. The expiration date 836 may be the date that the record expires, i.e., the date that the reference identifier 830 is no longer associated with the data 832.

As will be explained in greater detail below, a cache may be located on the computing device 110 to store records 822 from the reference database 120 that are downloaded from a server 410. In such an embodiment, each record 822 may also include a cache period 838. The expiration date 836 associated with a reference identifier 830 stored in the cache may be set based on the cache period 838 associated with the reference identifier 830. If the reference identifier 830 is not expected to change frequently, a long cache period 838 (e.g., perhaps several days or even months) may be assigned. If the reference identifier 830 is expected to change frequently, a shorter cache period 838 (or no cache period 838) may be assigned.

The data 832 may be changed after a graphical code 124 containing a reference identifier 830 is created. For example, when a graphical code 124 is initially created, the first portion 620a of the source data 114 may include a first domain name. Thus, the data 832 in the reference database 820 will initially include the first domain name. After the graphical code 124 is created, however, the data 832 in the reference database 820 may be changed to include a second domain name instead of the first domain name. If that occurs, then after a user scans the graphical code 124, the first portion 620a of the source data 114 output by the reference decoder 214 will also include the second domain name instead of the first domain name.

Figure 9:
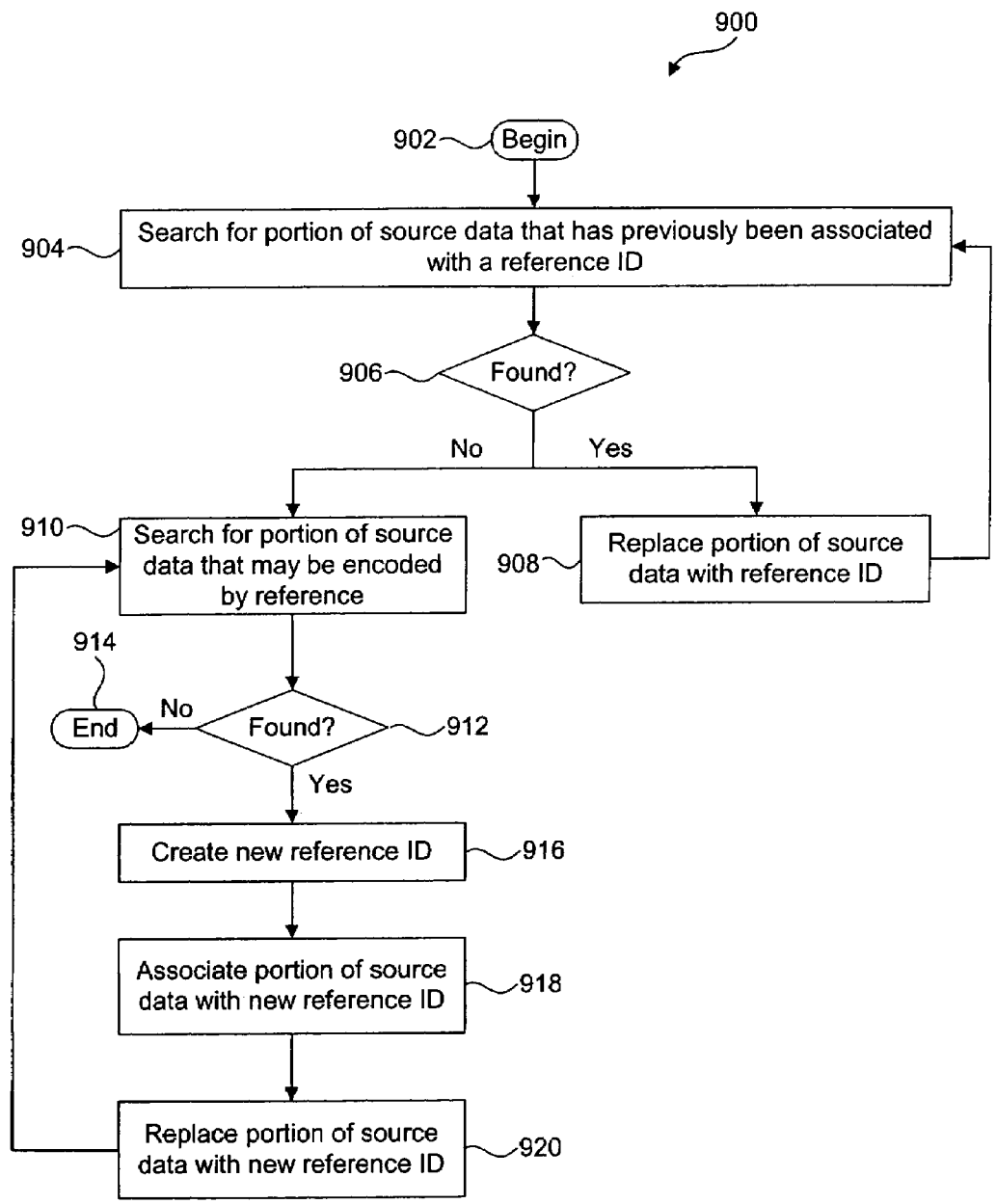
FIG. 9 is a flow diagram of a method for effecting conversion of the source data into reference encoded source data.

FIG. 9 is a flow diagram of a method 900 for effecting conversion of the source data 114 into reference encoded source data 118. The method 900 begins 902 by searching 904 for a portion 620 of the source data 114 that has previously been associated with a reference identifier 730. If a portion 620 of the source data 114 that has previously been associated with a reference identifier 730 is found 906, that portion 620 may be replaced 908 by the reference identifier 730.

In one embodiment, the method 900 may involve searching 904 the records 822 of the reference database 820 for data 832 that matches one or more portions 620 of the source data 114. If such data 832 is found 906 in a record 822 of the reference database 820, the portions 620 of the source data 114 that match the data 832 may be replaced by the reference identifier 830 associated with the data 832 in the record 822.

If a portion 620 of the source data 114 that has previously been associated with a reference identifier 730 is not found 906, the method 900 may involve searching 910 for a portion 620 of the source data 114 that may be encoded by reference. In one embodiment, this may involve prompting a user of the computing device 110 to select a portion 620 of the source data 114 to encode by reference.

If a portion 620 of the source data 114 that may be encoded by reference is not found 912, the method ends 914. If a portion 620 of the source data 114 that may be encoded by reference is found 912, a new reference identifier 730 may be created 916. The portion 620 of the source data 114 found 912 previously may then be associated 918 with the new reference identifier 730. In one embodiment, this step may involve storing the reference identifier 830 and the portion 620 of the source data 114 found 912 previously in the reference database 120. The method 900 may then involve replacing 920 the portion 620 of the source data 114 found 912 previously with the new reference identifier 730. The method 900 may then return to step 910 and proceed as described above.

Figure 10:
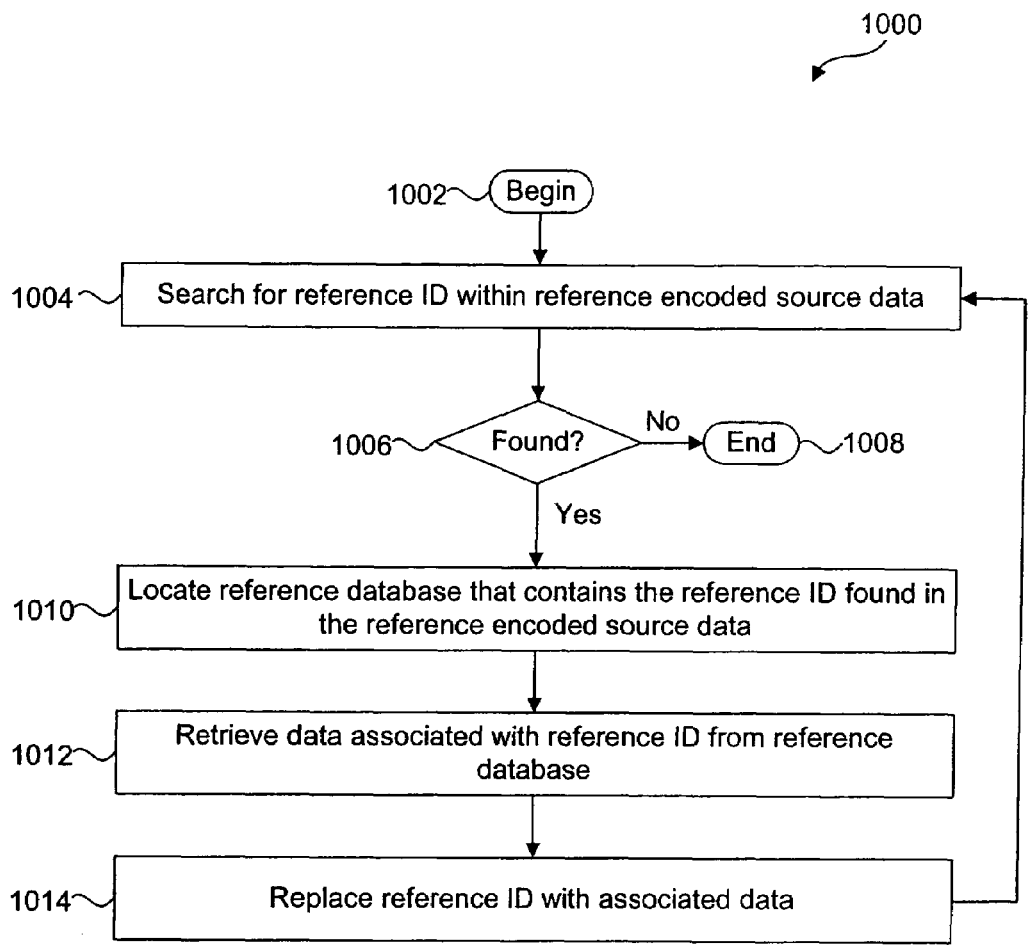
FIG. 10 is a flow diagram of a method for effecting conversion of the reference encoded source data into source data.

FIG. 10 is a flow diagram of a method 1000 for effecting conversion of the reference encoded source data 118 into source data 114. The method 1000 begins 1002 by searching 1004 for a reference identifier 730 within the reference encoded source data 118. As will be explained below, in one embodiment this may involve searching 1004 the reference encoded source data 118 for certain reserved symbols that identify the presence of a reference identifier 730.

If a reference identifier 730 is not found 1006 within the reference encoded source data 118, the method ends 1008. If a reference identifier 730 is found 1006 within the reference encoded source data 118, a reference database 120 that contains the reference identifier 730 may be located 1010. Data 832 associated with the reference identifier 730 may then be retrieved 1012 from the reference database 120, and the reference identifier 730 may be replaced 1014 with the associated data 832. The method 1000 may then return to step 1004 and proceed as described above.

Figure 11:
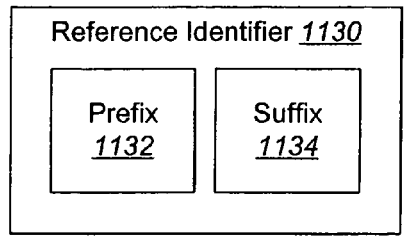
FIG. 11 is a block diagram of an embodiment of a reference identifier.

FIG. 11 is a block diagram of an embodiment of a reference identifier 1130. The reference identifier 1130 includes a prefix 1132 and a suffix 1134. The prefix 1132 may be positioned at the beginning of the reference identifier 1130, while the suffix 1134 may be positioned at the end of the reference identifier 1130.

Figure 12:
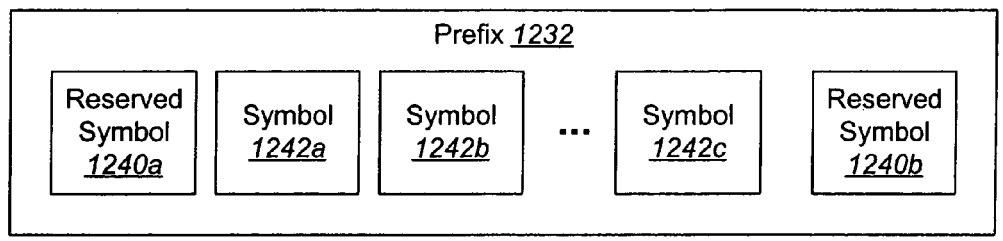
FIG. 12 is a block diagram of an embodiment of a prefix.

FIG. 12 is a block diagram of an embodiment of a prefix 1232. The prefix 1232 may include one or more symbols 1242. The prefix 1232 shown in FIG. 12 includes three symbols 1242a-c. The prefix 1232 may also include one or more reserved symbols 1240. The prefix 1232 shown in FIG. 12 includes two reserved symbols 1240a-b. One reserved symbol 1240a is positioned at the beginning of the prefix 1232, while the other reserved symbol 1240b is positioned at the end of the prefix 1232. The symbols 1242 and reserved symbols 1240 may be any character, indication, representation, or the like that may be converted into a graphical code 124.

Examples of symbols 1242 and reserved symbols 1240 include letters, numbers, punctuation marks, relational characters, etc. Typically, the reserved symbols 1240 are different than the symbols 1242, so that the reserved symbols 1240 may indicate the beginning and the end of the prefix 1232.

Figure 13:
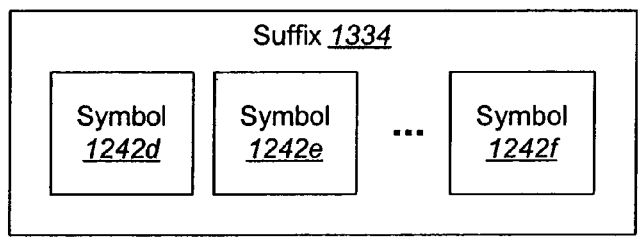
FIG. 13 is a block diagram of an embodiment of a suffix.

FIG. 13 is a block diagram of an embodiment of a suffix 1334. The suffix 1334 may include one or more symbols 1242. The suffix 1334 shown in FIG. 13 includes three symbols 1242*d-f*. Like the symbols 1242 in the prefix 1232, the symbols 1242 in the suffix 1334 may be any character, indication, representation, or the like that may be converted into a graphical code 124, including letters, numbers, punctuation marks, relational characters, etc.

Figure 14:
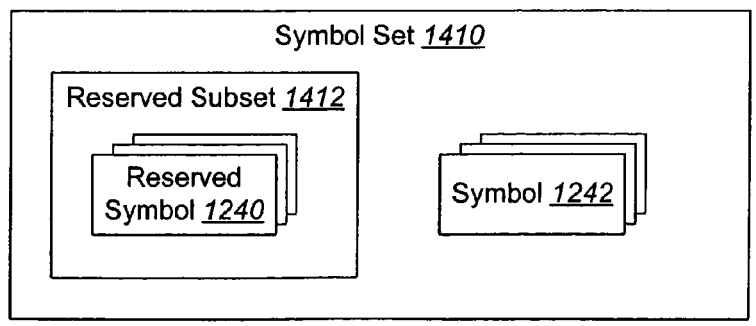
FIG. 14 is a block diagram of an embodiment of a symbol set.

The symbols 1242 and the reserved symbols 1240 may be selected from a symbol set 1410. The symbol set 1410 may include all available symbols 1242 and reserved symbols 1240, i.e., all symbols 1242 and reserved symbols 1240 that may be used in a prefix 1232 and/or a suffix 1334. FIG. 14 is a block diagram of an embodiment of a symbol set 1410. In the embodiment shown in FIG. 14, the symbol set 1410 includes a reserved subset 1412 that includes one or more reserved symbols 1240. The symbol set 1410 also includes a plurality of symbols 1242 that do not belong to the reserved subset 1412, i.e., the symbols 1242 and the reserved symbols 1240 in the reserved subset 1412 are different from one another.

In one embodiment, the source data 114 may include data elements that are not contained within the symbol set 1410. For example, if the symbol set 1410 contains only numbers, the source data 114 may still contain other symbols, such as letters. In such an embodiment, the data elements not contained within the symbol set 1410 must be converted into symbols that are contained within the symbol set 1410. One approach for accomplishing this may be summarized in the following four steps, which may be performed for each group of data elements that are not contained within the symbol set 1410:

1. Pad each element in the group of data elements to a predetermined width of binary digits by adding leading zeroes.
2. Form a binary number of the same width as in step 1 that contains the number of elements in the group (if the number of elements in the group is larger than can be stored in a binary number of this width, divide the group into multiple groups).
3. Concatenate first the binary number of step 2 and then all the data elements of step 1 into a single string of binary digits.
4. Create a symbol sequence by dividing the string of binary digits into words of the maximum width that will fit within the symbol set 1410, padding the last one to form a complete word. For example, if the symbol set is {0, 1, 2, 3, 4, 5, 6, 7, 8, 9}, the words will be 3 binary digits wide; three binary digits can represent values 0 through 7, which correspond to symbols 0 through 7 in the symbol set. Make one of the reserved symbols 1240 a prefix 1232 to the symbol sequence. Replace the original data elements in the source data 114 with the symbol sequence.

Source data 114 encoded in this manner may be referred to as alternate encoded source data 114. The reference decoder 214 may be configured to decode reference encoded source data 118 that includes an alternate encoded sequence. Alternatively, the reference decoder 214 may be configured to decode alternate encoded source data 114 (i.e., source data 114 that includes an alternate encoded sequence but that does not include any reference identifiers 730). One approach for decoding an alternate encoded sequence may be summarized in the following steps:

1. Locate, a reserved symbol 1240 that indicates the beginning of the alternate encoded sequence.
2. Select the padded element width, which will be abbreviated herein as w.
3. Obtain the next symbol in the alternate encoded sequence.
4. Convert the next symbol in the alternate encoded sequence from base m to binary. The result of this operation will be abbreviated herein as x.
5. If x is narrower (in number of binary digits) than w, repeat step 4 and append the result to x.
6. Take the w leftmost bits of x and call it n.
7. Delete the w leftmost bits of x.
8. While the width of x is less than (n*w), perform step 9.
9. Obtain the next symbol in the alternate-encoded sequence, convert it from base m to binary, and append the result to x.
10. Split x into n elements, each w bits wide.
11. In the decoded data, replace the alternate-encoded sequence (beginning with the reserved symbol 1240 and continuing through all the symbols obtained in steps 3 through 9) with the symbols obtained in step 10.
12. Repeat step 3 beginning at the point in the decoded data immediately after the symbols that were replaced in step 11.

Figure 15:
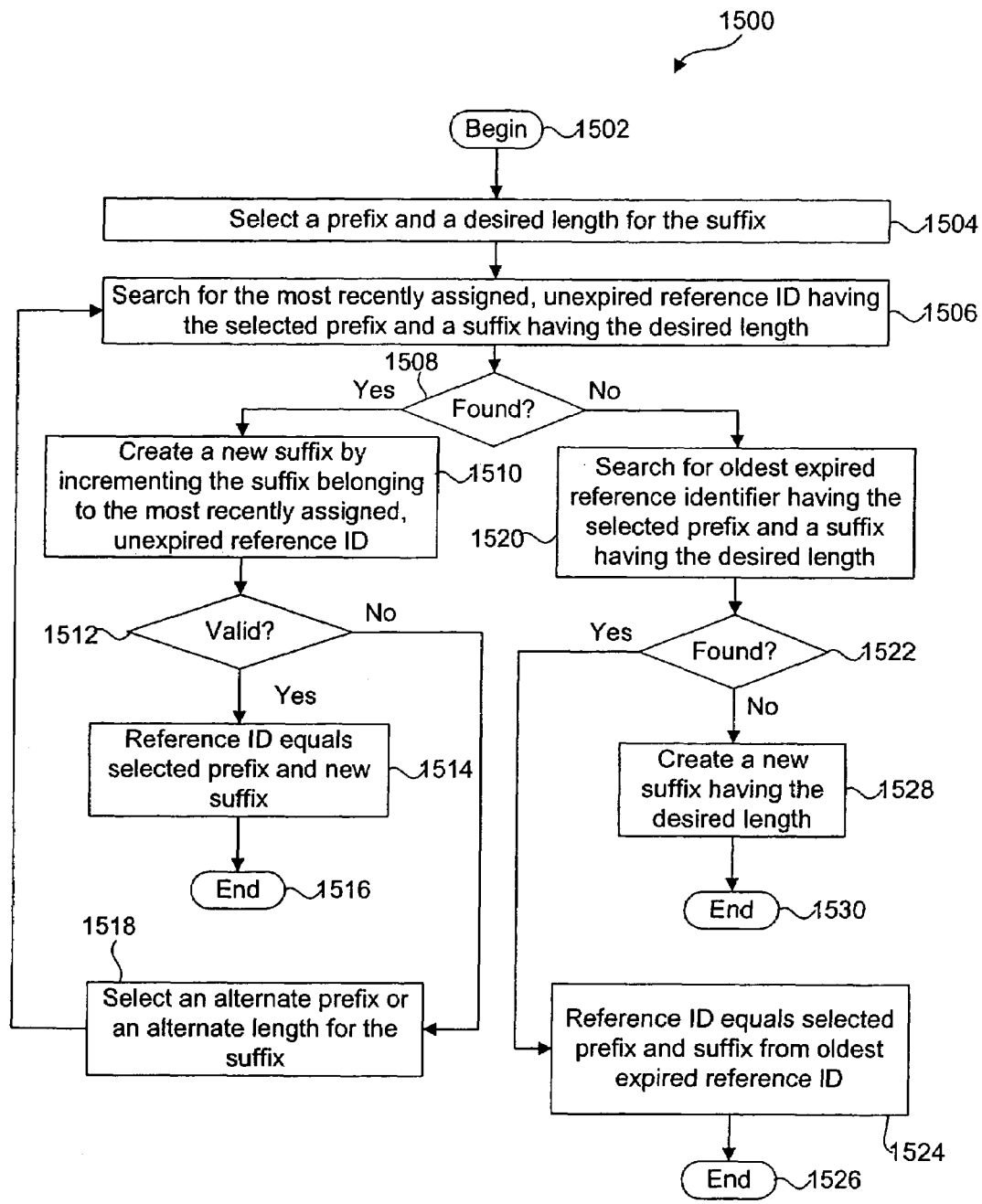
FIG. 15 is a flow diagram illustrating a method for creating a new reference identifier.

FIG. 15 is a flow diagram illustrating a method 1500 for creating 916 a new reference identifier 730. The method 1500 begins 1502 by selecting 1504 a prefix 1132 and a desired length for a suffix 1134, and then searching 1506 the reference database 120 for the most recently assigned, unexpired reference identifier 730 having the selected prefix 1132 and a suffix 1134 having the desired length. In one embodiment, the most recently assigned, unexpired reference identifier 730 may have the most recent creation date 834 of those records 822 with expiration dates 836 that have yet to occur.

If such a reference identifier 730 is found 1508, a new suffix 1134 may be created 1510 by incrementing the suffix 1134 belonging to the most recently assigned, unexpired reference identifier 730. For example, suppose the most recently assigned, unexpired reference identifier 730 has a suffix 1134 equal to the number 444. The new suffix 1134 may then be equal to the number 445. Alternatively, suppose the most recently assigned, unexpired reference identifier 730 has a suffix 1134 equal to the letter sequence aaa. The new suffix 1134 may then be equal to the letter sequence aab.

The method 1500 may then involve determining 1512 whether the new suffix 1134 is valid. Suppose in step 1504 that the desired length for the suffix 1134 is selected to be three. Both of the new suffixes 1134 in the examples given above (the number 445 and the letter sequence aab) would be valid, because they both have a length of three. However, suppose the most recently assigned, unexpired reference identifier 730 has a suffix 1134 equal to the number 999. The new suffix 1134 may then be equal to the number 1000. However, the number 1000 would not be a valid suffix 1134, because it has a length of four.

If it is determined 1512 that the new suffix 1134 is valid, the reference identifier 730 is made 1514 equal to the prefix 1132 selected in step 1504 and the new suffix 1134 created in step 1510. The method 1500 then ends 1516. If it is determined 1512 that the new suffix 1134 is not valid, an alternate prefix 1132 or an alternate length for the suffix 1134 may be selected 1518. The method 1500 may then return to step 1506 and proceed as described above.

If an unexpired reference identifier 730 having the selected prefix 1132 and a suffix 1134 having the desired length is not found 1508, the method 1500 may then include searching 1520 for the oldest expired reference identifier 730 having the selected prefix 1132 and a suffix 1134 having the desired length. In one embodiment, the oldest expired reference identifier 730 may have the earliest creation date 834 of those records 822 with expiration dates 836 that are in the past.

If an expired reference identifier 730 having the selected prefix 1132 and a suffix 1134 having the desired length is found 1522, the reference identifier 730 may be made 1524 equal to the prefix 1132 selected in step 1504 and the suffix 1134 from the oldest expired reference identifier 730. The method 1500 may then end 1526.

If an expired reference identifier 730 having the selected prefix 1132 and a suffix 1134 having the desired length is not found 1522, a new suffix 1134 having the desired length may be created 1528. The method 1500 may then end 1530.

Figure 16:
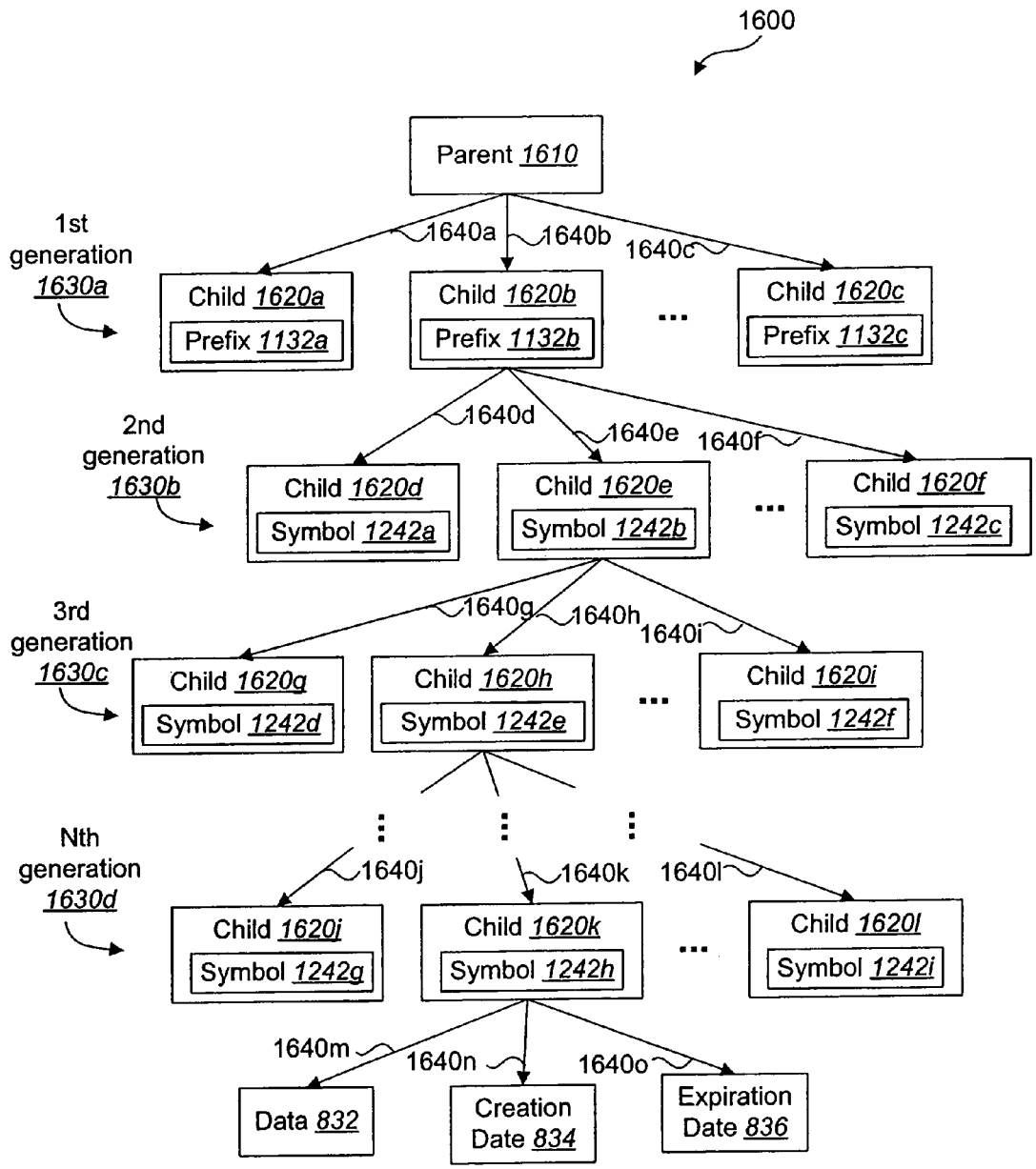
FIG. 16 is a block diagram of an embodiment of a data structure that may be used to store the reference database.

FIG. 16 is a block diagram of an embodiment of a data structure 1600 that may be used to store the reference database 820. The data structure 1600 shown in FIG. 16 allows a reference identifier 730 to be stored in the reference database 120 without a terminating symbol 1242, i.e., a symbol 1242 that uniquely identifies the end of the reference identifier 730.

The data structure 1600 includes a parent node 1610 and a plurality of child nodes 1620. The child nodes 1620 are organized into N generations 1630, where N is any positive integer. The parent node 1610 includes one or more pointers 1640, one to each child node 1620 in the 1st generation 1630a.

Each child node 1620 (in a generation 1630 other than the Nth generation 1630d) may include one or more pointers 1640 to a child node 1620 in a higher-numbered generation 1630. For example, a child node 1620b in the 1st generation 1630a may include a plurality of pointers 1640d-f to child nodes 1620d-f in the 2nd generation 1630b, a child node 1620e in the 2nd generation 1630b may include a plurality of pointers 1640g-i to child nodes 1620g-i in the 3rd generation 1630c, and so forth.

One or more reference identifiers 730 may be stored within the data structure 1600. For example, the prefix 1132 of a reference identifier 730 may be stored in a child data structure 1620 in the 1st generation 1630a. The suffix 1134 of a reference identifier 730 may be stored in one or more child data structures 1620 in the 2nd generation 1630b through the Nth generation 1630d. For example, the first symbol 1242 in a suffix 1134 may be stored in a child data structure 1620 in the 2nd generation 1630b, the second symbol 1242 in a suffix 1134 may be stored in a child data structure 1620 in the 3rd generation 1630c, and so forth.

A child node 1620 that stores the last symbol 1242 in a suffix 1134 may include one or more pointers 1640 to other information that may be stored in a record 822 within the reference database 120. For example, the child node 1620k in the Nth generation 1630d may include a pointer 1640m to data 832 associated with the reference identifier 730, a pointer 1640n to the creation date 834 of the reference identifier 730, and a pointer 1640o to the expiration date 836 of the reference identifier 730.

Figure 17:
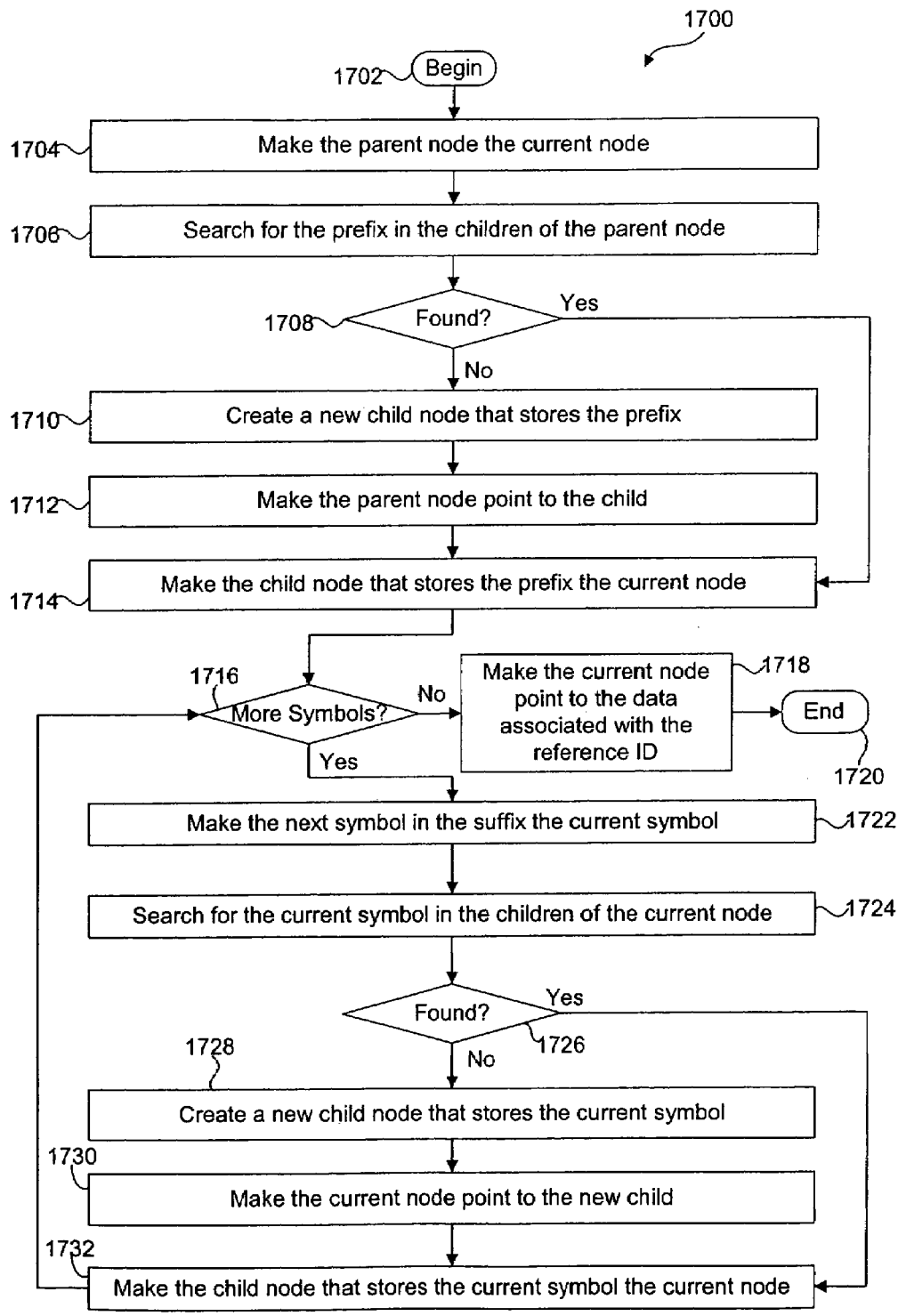
FIG. 17 is a flow diagram of a method for associating a portion of source data and a reference identifier.

FIG. 17 is a flow diagram of a method 1700 for associating 918 a portion 620 of source data 114 and a reference identifier 730. In the embodiment described in FIG. 17, associating 918 a portion 620 of source data 114 and a reference identifier 730 involves storing the reference identifier 730 and the portion 620 of the source data 114 in a reference database 120. The reference database 120 may be implemented using the data structure 1600 illustrated in FIG. 16 and described in connection therewith.

The method 1700 begins 1702 by making 1704 the parent node 1610 the current node and then searching 1706 for the prefix 1132 of the reference identifier 730 in the child nodes 1620 to which the parent node 1610 points.

If the prefix 1132 is not found 1708, a new child node 1620 that stores the prefix 1132 may be created 1710. The parent node 1610 may then be made 1712 to point to the new child node 1620 created in step 1710. The child node 1620 that stores the prefix 1132 may then be made 1714 to be the current node. If in step 1708 the prefix 1132 is found in one of the child nodes 1620 to which the parent node 1610 points, the method 1700 may proceed directly to step 1714.

The method 1700 may then determine 1716 whether there are additional symbols 1242 in the suffix 1134 of the reference identifier 730 to be stored. If it is determined 1716 that there are not additional symbols 1242 in the suffix 1134 of the reference identifier 730 to be stored, the current node may be made 1718 to point to the data 832 associated with the reference identifier 730. The current node may be made 1718 to point to other information as well, such as the creation date 834 and/or the expiration date 836 of the reference identifier 730. The method 1700 may then end 1720.

If it is determined 1716 that there are additional symbols 1242 in the suffix 1134 of the reference identifier 730 to be stored, the next symbol 1242 in the suffix 1134 may be made 1722 to be the current symbol 1242. The method 1700 may then involve searching 1724 for the current symbol 1242 in the child nodes 1620 to which the current node points.

If the current symbol 1242 is not found 1726, a new child node 1620 may be created 1728 that stores the current symbol 1242. The current node may be made to point 1730 to the new child node 1620. The method 1700 may then involve making 1732 the child node 1620 that stores the current symbol 1242 the current node. The method 1700 may then return to step 1716 and proceed as described above. If in step 1726 the current symbol is found 1726 in the child nodes 1620 to which the current node points, the method 1700 may proceed directly to step 1732.

Figure 18:
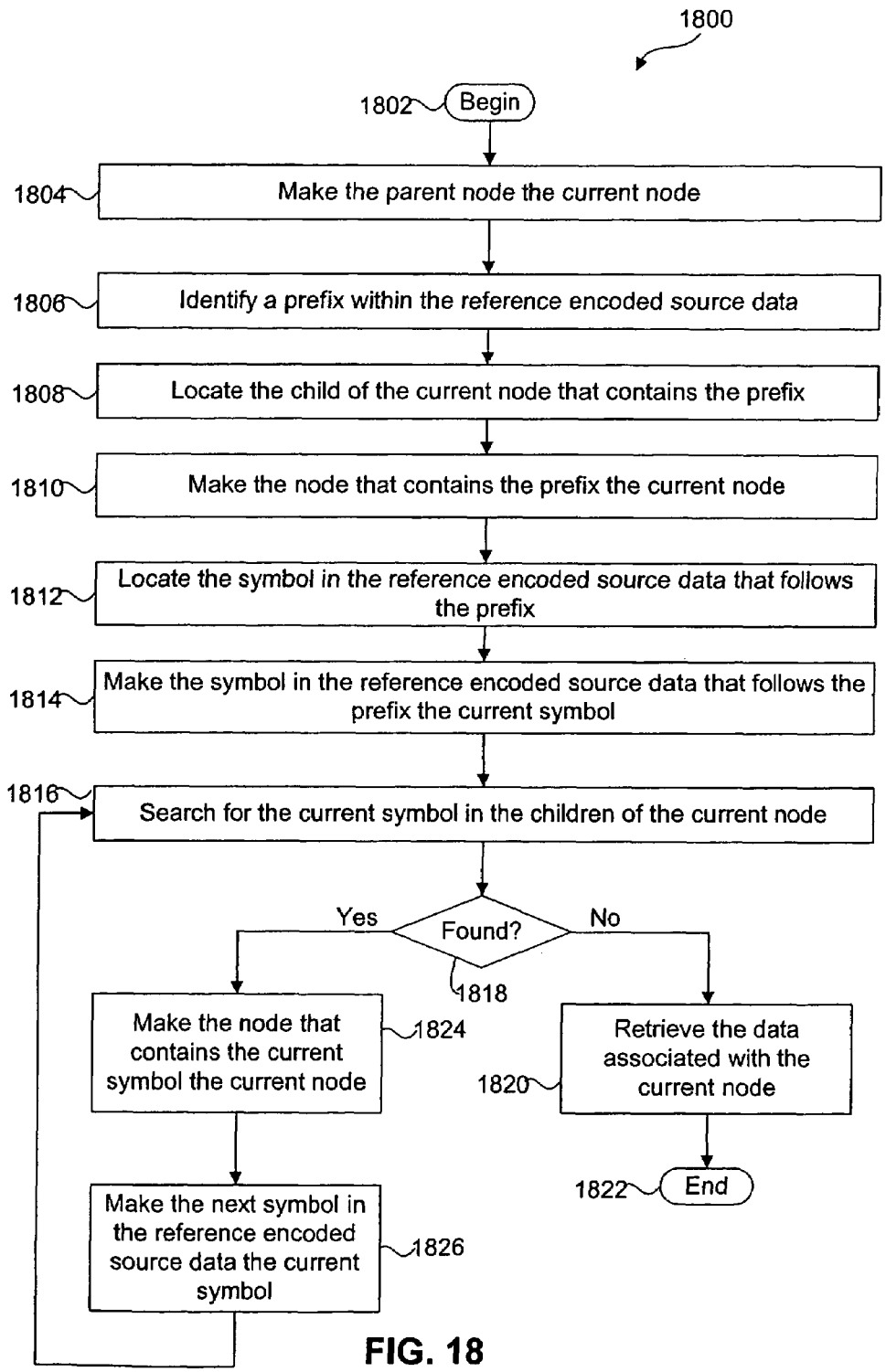
FIG. 18 is a flow diagram of a method for retrieving data associated with a reference identifier.

FIG. 18 is a flow diagram of a method 1800 for retrieving 1012 data 832 associated with a reference identifier 730. The method 1800 begins 1802 by making 1804 the parent node 1610 the current node. The method 1800 may then involve identifying 1806 a prefix 1132 within the reference encoded source data 118. In one embodiment, this may involve searching the reference encoded source data 118 for first and second reserved symbols 1240a-b from the reserved subset 1412. In such an embodiment, the prefix 1132 includes the first and second reserved symbols 1240a-b and the symbols 1242 positioned between the first and second reserved symbols 1240a-b.

The method 1800 may then involve locating 1808 the child node 1620 to which the current node points and that contains the prefix 1132 found in the reference encoded source data 118. The node found in step 1808 may then be made 1810 to be the current node. The method 1800 may then involve locating 1812 the symbol 1242 in the reference encoded source data 118 that follows the prefix 1132. The symbol 1242 found in step 1812 may then be made 1814 to be the current symbol 1242.

The method 1800 may then involve searching 1816 for the current symbol 1242 in the child nodes 1620 to which the current node points. If the current symbol 1242 is not found 1818, this means that the end of the suffix 1134 has been reached. The method 1800 may then involve retrieving 1820 the data 832 (and/or other information) to which the current node points. The method 1800 then ends 1822.

If the current symbol 1242 is found 1818 in one of the child nodes 1620 to which the current node points, the child node 1620 that contains the current symbol 1242 may be made 1824 to be the current node. The next symbol 1242 in the reference encoded source data 118 may then be made 1826 to be the current symbol 1242. The method 1800 may then return to step 1816 and proceed as described above.

Figure 19:
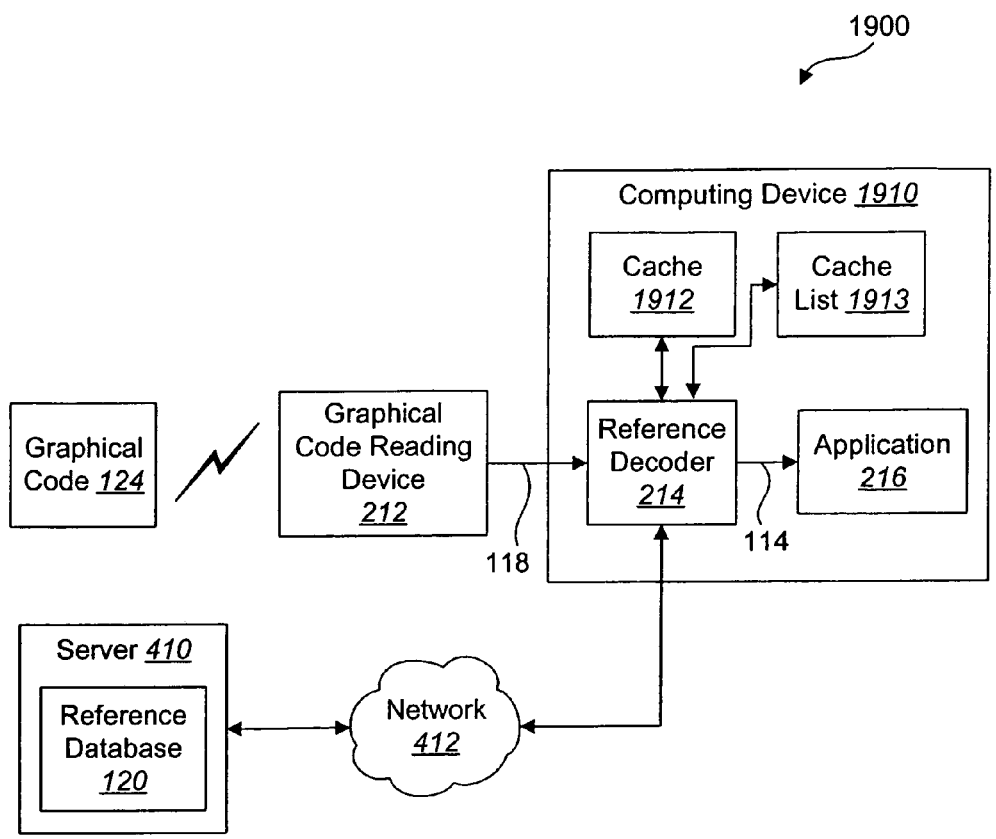
FIG. 19 is a block diagram of an alternate embodiment of a system for decoding machine-readable graphical codes.

FIG. 19 is a block diagram of an alternate embodiment of a system 1900 for decoding machine-readable graphical codes. The system 1900 shown in FIG. 19 is similar to the system 400 shown in FIG. 4 except that the computing device 1910 additionally includes a reference database cache 1912 in electronic communication with the reference decoder 214. The cache 1912 may be implemented with any type of memory structure that may be read from and written to by the reference decoder 214.

As in FIG. 4, in the system 1900 shown in FIG. 19 the reference database 120 is located on a server 410 that is in electronic communication with the computing device 1910 over a network 412. The cache 1912 may be used to store records 822 from the reference database 120 that are downloaded from the server 410.

Multiple reference databases 1912 may be located on the computing device 1910. The computing device 1910 may also include a reference database list 1913 which is in electronic communication with the reference decoder 214. The reference database list 1913 may include a list of reference databases 1912 that should be accessed before attempting lookup over the server 410. The reference decoder 214 may attempt lookup on the reference databases 1912 in the reference database list 1913 before attempting lookup on the server 410.

For example, a textbook may come with a supplementary CD that stores example programs, multimedia presentations, and the like. The textbook may contain graphical codes 124 that invoke the content on the CD. To keep these graphical codes 124 small, they may include reference identifiers 730. The CD itself may include a reference database 1912 which includes reference identifiers 730 and associated data 832. When the CD is first inserted into the computing device 1910 (or when the CD's installer is invoked), the installer program may add the reference database 1912 located on the CD to the reference database list 1913. Subsequently, when a graphical code 124 in the textbook is scanned, the lookup may first be tried in the reference database 1912 on the CD. Only if the reference identifier 730 is not found in the reference database 1912 on the CD will lookup on the server 410 be performed.

Figure 20:
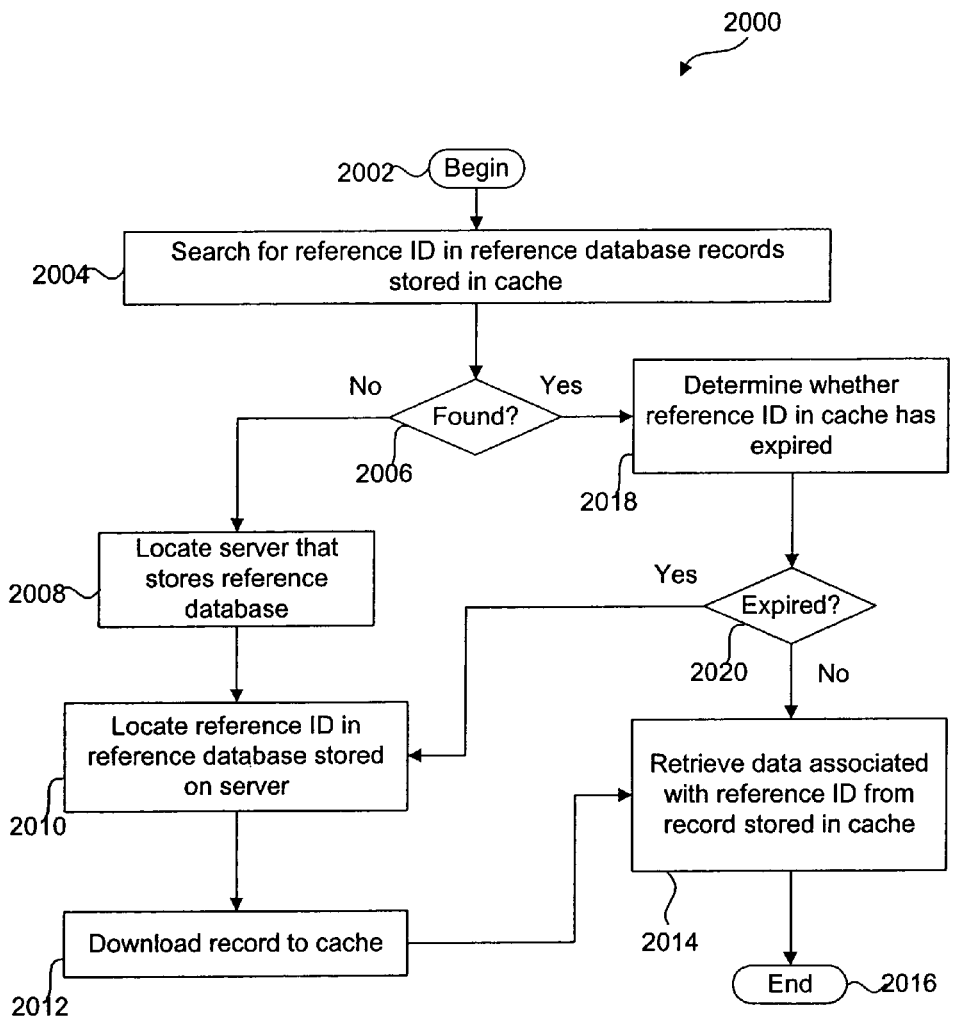
FIG. 20 is a flow diagram of a method for locating a reference database that contains a reference identifier found in the reference encoded source data.

FIG. 20 is a flow diagram of a method 2000 for locating 1010 a reference database 120 that contains a reference identifier 730 found in the reference encoded source data 118. The method 2000 begins 2002 by searching 2004 for a reference identifier 730 in the records 822 of the reference database 120 that are stored in the cache 1912.

If the reference identifier 730 found in the reference encoded source data 118 is not found 2006 in the records 822 of the reference database 120 that are stored in the cache 1912, a server 410 that stores the reference database 120 may be located 2008. The reference identifier 730 may then be located 2010 in the reference database 120 stored on the server 410. The record 822 containing the reference identifier 730 may then be downloaded 2012 to the cache 1912. The data 832 (and possibly other information) associated with the reference identifier 730 may then be retrieved 2014 from the record 822 stored in the cache 1912. The method 2000 may then end 2016.

If the reference identifier 730 found in the reference encoded source data 118 is found 2006 in the records 822 of the reference database 120 that are stored in the cache 1912, it may then be determined 2018 whether the record 822 in the cache 1912 that contains the reference identifier 730 has expired. This may involve evaluating the expiration date 836 in the record 822 containing the reference identifier 730. If the reference identifier 730 in the cache 1912 has expired 2020, the method 2000 may return to step 2010 and proceed as described above. If the reference identifier 730 in the cache 1912 has not expired 2020, the method 2000 may return to step 2014 and proceed as described above.

Figure 21:
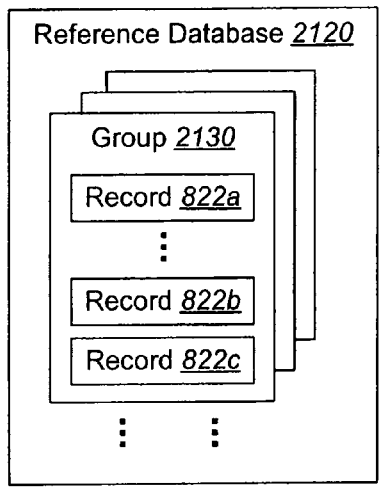
FIG. 21 is a block diagram of an alternative embodiment of a reference database.

FIG. 21 is a block diagram of an alternative embodiment of a reference database 2120. As before, the reference database 2120 includes a plurality of records 822. In FIG. 21, however, the records 822 are organized into groups 2130. Each group 2130 may include related records 822. For example, a group 2130 may include records 822 containing reference identifiers 730 that may be used to create graphical codes 124 that will be placed on the same page in a catalog, in the same magazine article, etc.

Figure 22:
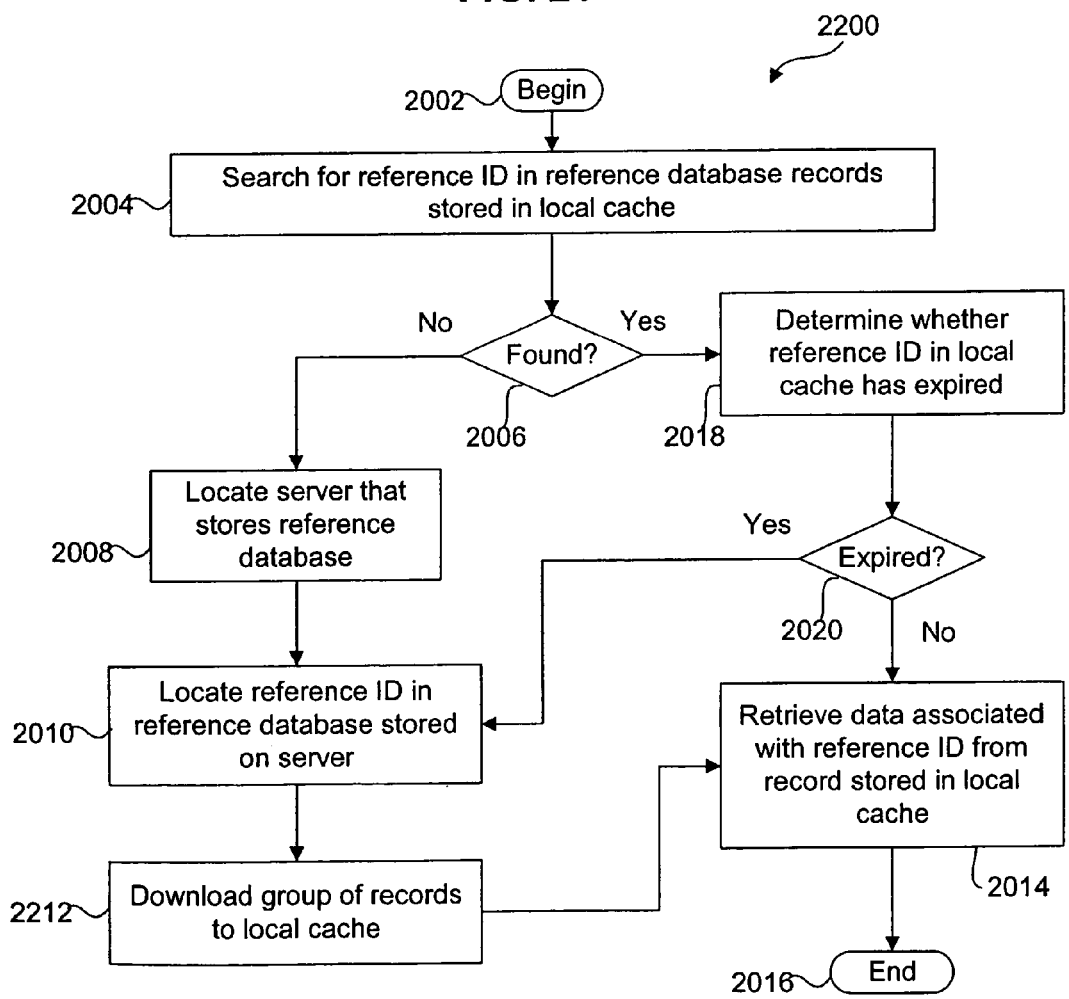
FIG. 22 is a flow diagram of an alternative method for locating a reference database that contains a reference identifier found in the reference encoded source data.

FIG. 22 is a flow diagram of an alternative method 2200 for locating 1010 a reference database 120 that contains a reference identifier 730 found in the reference encoded source data 118. The method 2200 shown in FIG. 22 is similar to the method 2000 shown in FIG. 20 except for the following. In the embodiment of the method 2200 shown in FIG. 22, once the reference identifier 730 found in the reference encoded source data 118 is located 2010 in the reference database 120 stored on the server 410, the entire group 2130 that includes the record 822 containing the reference identifier 730 is downloaded 2212 to the cache 1912.

Downloading 2212 the group 2130 of records 822 to the cache 1912 may not occur all at once. For example, the record 822 containing the reference identifier 730 found in the reference encoded source data 118 may be first downloaded 2212 to the cache 1912. Then, the remaining records 822 in the same group 2130 may be subsequently downloaded 2212. This may reduce the latency associated with downloading 2212 the record 822 containing the reference identifier 730 found in the reference encoded source data 118.

Figure 23:
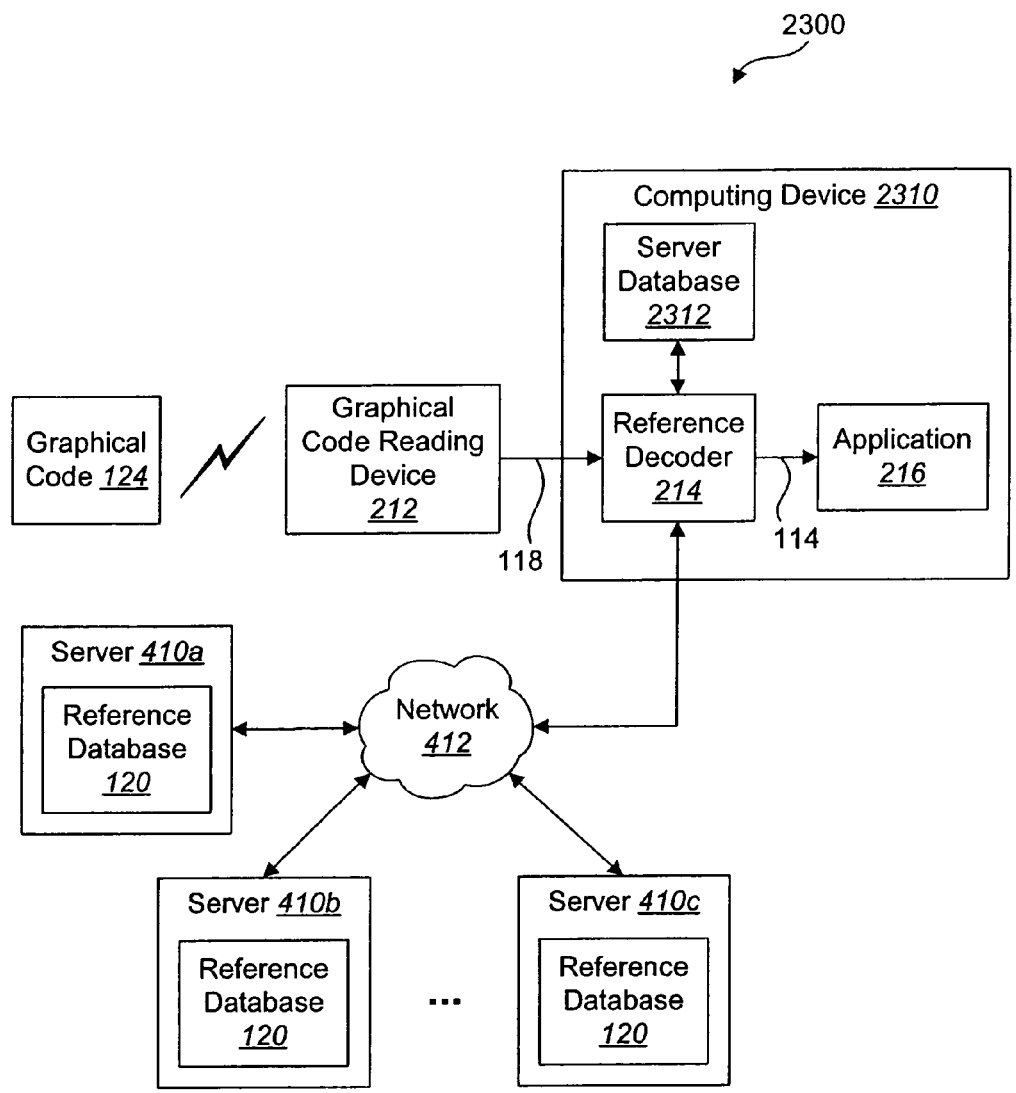
FIG. 23 is a block diagram illustrating an alternative embodiment of a system for decoding machine-readable graphical codes.

FIG. 23 is a block diagram illustrating an alternative embodiment of a system 2300 for decoding machine-readable graphical codes. The system 2300 shown in FIG. 23 is similar to the system 400 shown in FIG. 4 except for the following. In the system 2300 shown in FIG. 23, the reference database 120 is located on a plurality of servers 410a-c that are each in electronic communication with the computing device 2310 over one or more networks 412. In addition, in FIG. 23 the computing device 2310 includes a server database 2312 that stores information about the servers 410. The reference decoder 214 is in electronic communication with the server database 2312.

Figure 24:
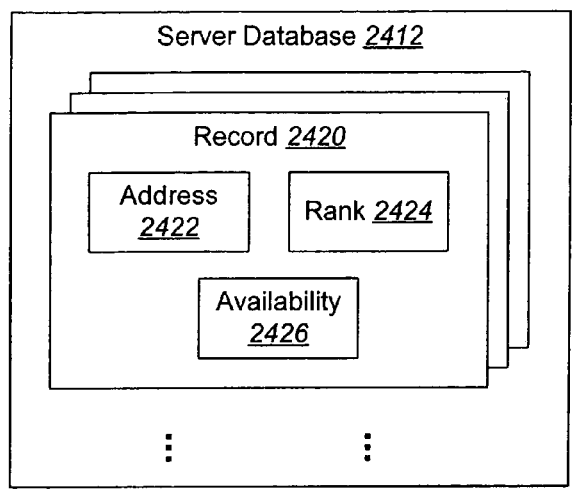
FIG. 24 is a block diagram of an embodiment of the server database.

FIG. 24 is a block diagram of an embodiment of the server database 2412. In one embodiment, an updated server database 2412 is periodically downloaded to the computing device 2310 from any one of the servers 410. The server database 2412 may include a plurality of records 2420. Each record 2420 may include information about a server 410. For example, each record 2420 may include the address 2422 of a particular server 410. The address 2422 may be an IP address, MAC address, etc.

Each record 2420 may also include the rank 2424 of a particular server 410. The rank 2424 is a measure of when the reference decoder 214 should contact the server 410 corresponding to the record 2420 relative to other servers 410 in the server database 2412. For example, if a server 410 has a rank 2424 of one, this may indicate that the reference decoder 214 should attempt to contact that server 410 before attempting to contact any other servers 410 in the server database 2412.

Each record 2420 may also include the availability 2426 of a particular server 410. In one embodiment, the availability

2426 of a server 410 may be either "available" or "not available." The availability 2426 of each server 410 may be initially set to "available." If the reference decoder 214 attempts to establish communication with a server 410 and fails, that server's 410 availability 2426 may be set to "not available" for a set period of time.

Figure 25:
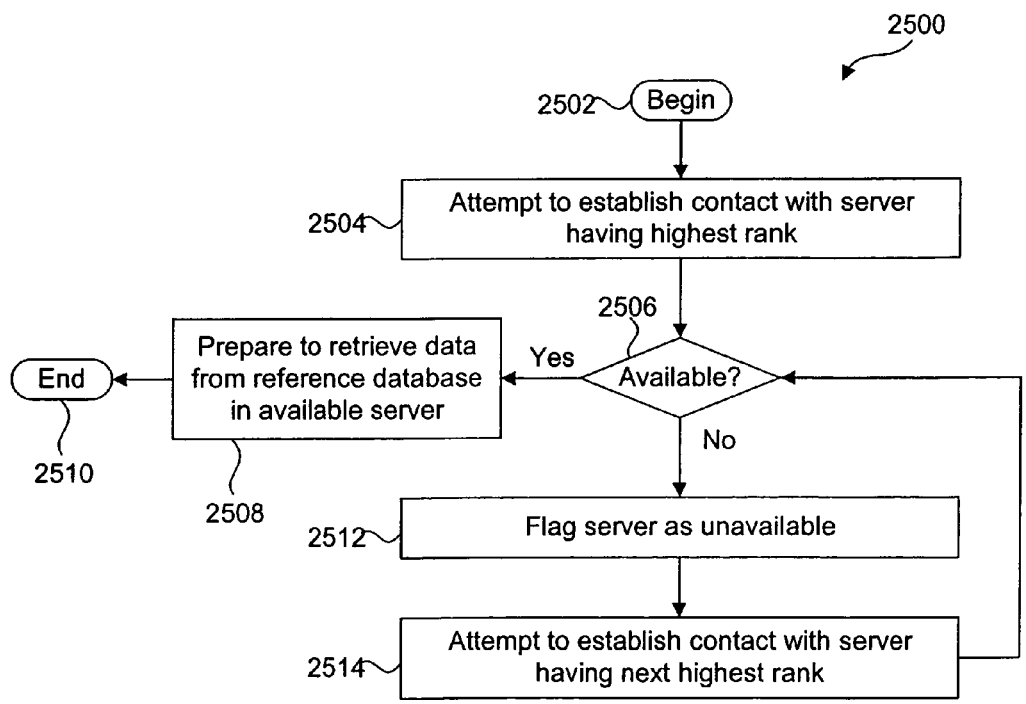
FIG. 25 is a flow diagram of a method for locating a reference database that contains a reference identifier identified in the reference encoded source data.

FIG. 25 is a flow diagram of a method 2500 for locating 1010 a reference database 120 that contains a reference identifier 730 identified in the reference encoded source data 118. The method 2500 begins 2502 by attempting 2504 to establish contact with the server 410 having the highest rank 2424. If it is determined 2506 that the server 410 having the highest rank 2424 is available, the method 2500 may then involve preparing 2508 to retrieve data 832 (and possibly other information) from the reference database 120 in the available server 410. The method 2500 may then end 2510.

If it is determined 2506 that the server 410 having the highest rank 2424 is not available, the method 2500 may then involve flagging 2512 that server as unavailable. In one embodiment, this may involve setting the availability 2426 of a particular server 410 to "not available." The method 2500 may then involve attempting 2514 to establish contact with the server 410 having the next highest rank 2424. The method 2500 may then return to step 2506 and proceed as described above.

Figure 26:
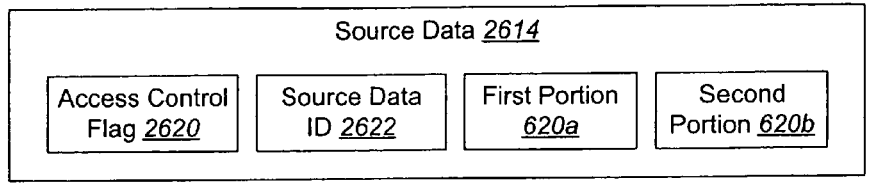
FIG. 26 is a block diagram of an alternative embodiment of source data that may be generated by the data generator.

FIG. 26 is a block diagram of an alternative embodiment of source data 2614 that may be generated by the data generator 112. Like the source data 614 shown in FIG. 6, the source data 2614 shown in FIG. 26 includes a first portion 620a and a second portion 620b. In addition, the embodiment of the source data 2614 shown in FIG. 26 includes an access control flag 2620. The access control flag 2620 indicates that access to the source data 2614 should be controlled. For example, the source data 2614 may be a URL that references a web page. The access control flag 2620 may indicate that access to the web page should be controlled.

The embodiment of the source data 2614 shown in FIG. 26 includes a source data identifier 2622. The source data identifier 2622 may identify the source data 2614 itself. The source data 2614 may be identified uniquely or as belonging to a group.

Alternatively, the source data identifier 2622 may identify the provider of the graphical code 124. In such an embodiment, the reference decoder 214 may be configured to accept only access-controlled reference encoded source data with certain source data identifiers 2622. This way, the reference decoder 214 may be configured so that the application 216 will only receive source data 114 from trusted sources.

Figure 27:
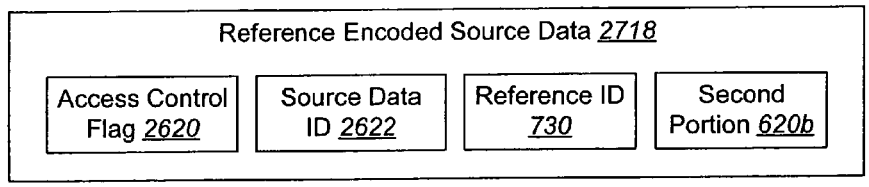
FIG. 27 is a block diagram of an embodiment of reference encoded source data.

FIG. 27 is a block diagram of an embodiment of reference encoded source data 2718. The reference encoder 116 may effect conversion of the source data 2614 shown in FIG. 26 into the reference encoded source data 2718 shown in FIG. 27. The reference encoded source data 2718 includes the second portion 620b of the source data 2614, and a reference identifier 730 in place of the first portion 620a of the source data 2614. The reference encoded source data 2718 shown in FIG. 27 also includes the access control flag 2620 and the source data identifier 2622. In alternative embodiments, the access control flag 2620 and/or the source data identifier 2622 may be replaced in the reference encoded source data 2718 by reference identifiers 730.

Figure 28:
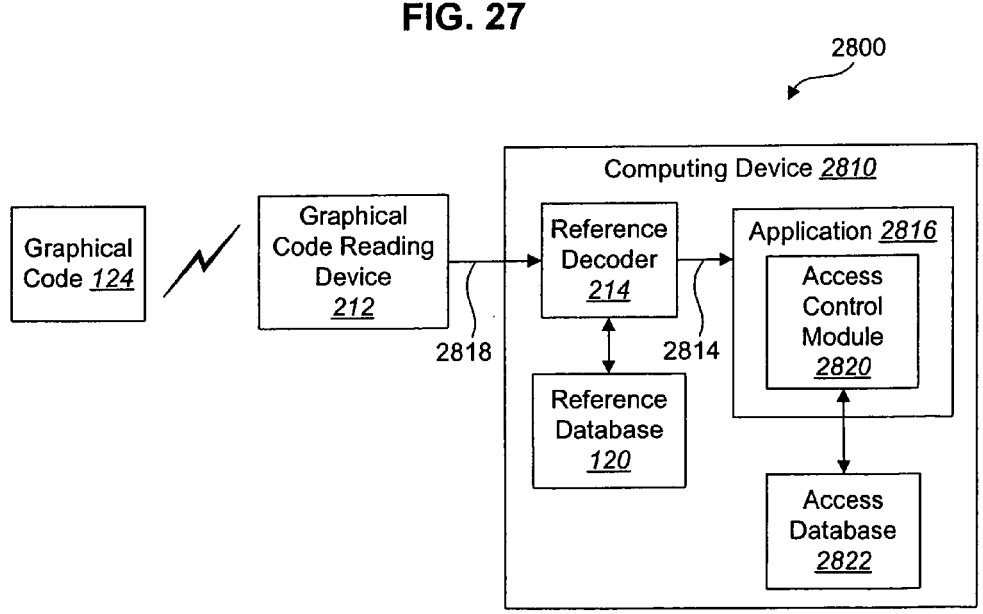
FIG. 28 is a block diagram of an embodiment of an alternative system for decoding machine-readable graphical codes.

FIG. 28 is a block diagram of an embodiment of an alternative system 2800 for decoding machine-readable graphical codes. The system 2800 shown in FIG. 28 is similar to the system 200 shown in FIG. 2 except for the following. In the system 2800 shown in FIG. 28, the graphical code reading device 212 is configured to read the graphical code 124 and convert it into user designated reference encoded source data 2818. The reference decoder 214 is configured to receive the user designated reference encoded source data 2818 and convert it into user designated source data 2814. The user designated reference encoded source data 2818 is similar to the embodiment of the reference encoded source data 2718 shown in FIG. 27, and the user designated source data 2814 is similar to the embodiment of the source data 2614 shown in FIG. 26, except that the user designated reference encoded source data 2818 and the user designated source data 2814 both include identifying information about the user of the application 2816.

As in the system 200 shown in FIG. 2, a software application 2816 may be running on the computing device 2810. In the system 2800 shown in FIG. 28, the application 2816 includes an access control module 2820 in electronic communication with an access database 2822. The access control module 2820 is configured to control the application's 2816 use of the user designated source data 2814 by reference to authorization information contained in the access database 2822. Specifically, the application 2816 may receive the user designated source data 2814 as input. The user designated source data 2814 may include command data that may be recognized by the application 2816 as a command to perform a task. By comparing the identifying information about the user of the application 2816 with authorization information contained in the access database 2822, the access control module 2820 may determine whether the user of the application 2816 is authorized to effect performance of the task corresponding to the command.

For example, the user designated source data 2814 may include a URL, which may be recognized by the application 2816 as a command to display a web page corresponding to the URL. By comparing the identifying information about the user of the application 2816 with a list of authorized users in the access database 2822, the access control module 2820 may determine whether the user of the graphical code reading device 212 is authorized to access the web page corresponding to the URL.

Of course, in alternative embodiments the reference database 120 and/or the access database 2822 may be located on one or more servers 410 that are in electronic communication with the computing device 2810 over one or more networks 412.

Figure 29:
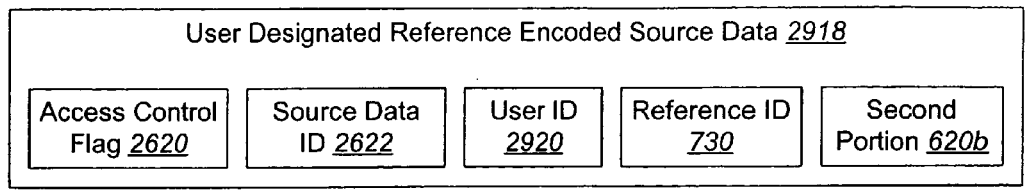
FIG. 29 is a block diagram of an embodiment of the user designated reference encoded source data.

FIG. 29 is a block diagram of an embodiment of the user designated reference encoded source data 2918. The user designated reference encoded source data 2918 shown in FIG. 29 is similar to the reference encoded source data 2718 shown in FIG. 27, except that the user designated reference encoded source data 2918 shown in FIG. 29 also includes a user identifier 2920. The user identifier 2920 identifies the user of the application 2816. In one embodiment, the user identifier 2920 may uniquely identify the device that generated the user designated reference encoded source data 2918. For example, in the system 2800 shown in FIG. 28, the user identifier 2920 may uniquely identify the graphical code reading device 212. Alternatively, the user identifier 2920 may uniquely identify the computing device 2810. Alternatively still, the user identifier 2920 may be the user identifier 2920 that allows a user to log on to the computing device 2810 and/or the application 2816. Those skilled in the art will recognize numerous alternative configurations for the user identifier 2920' in light of the teachings contained herein.

The user identifier 2920 is typically inserted into the user designated reference encoded source data 2918 by the graphical code reading device 212 or the reference decoder 214. In one embodiment, the reference encoded source data 2718 includes one or more replaceable tags (not shown) for identifying the user. Upon detection of the access control flag 2620, the graphical code reading device 212 or reference decoder 214 may replace these tags with the corresponding user identifiers 2920. For example, the tag <insert-scanner-id> may be replaced with the serial number of the graphical code reading device 212.

Figure 30:
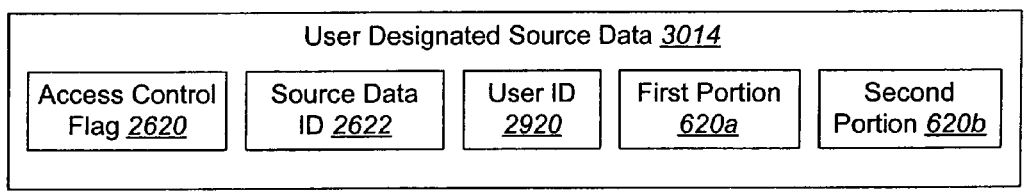
FIG. 30 is a block diagram of an embodiment of the user designated source data.

FIG. 30 is a block diagram of an embodiment of the user designated source data 3014. The embodiment of the user designated source data 3014 shown in FIG. 30 is similar to the embodiment of the source data 2614 shown in FIG. 26, except that the embodiment of the user designated source data 3014 shown in FIG. 30 also includes a user identifier 2920. As described previously, the user identifier 2920 identifies the user of the application 2816.

Figure 31:
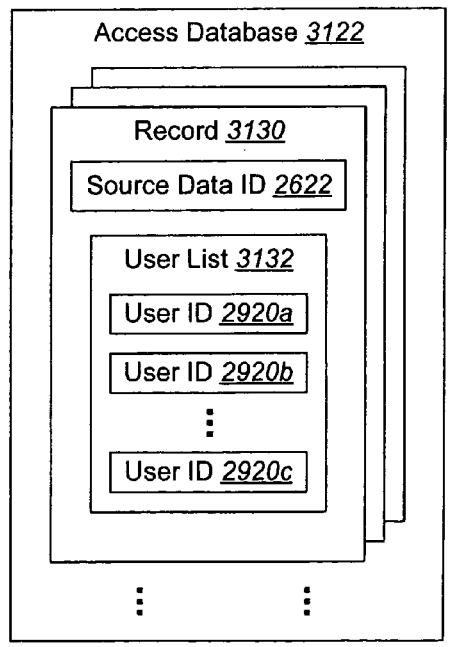
FIG. 31 is a block diagram of an embodiment of the access database.

FIG. 31 is a block diagram of an embodiment of the access database 3122. The access database 3122 may include a plurality of records 3130. Each record 3130 may include a source data identifier 2622. Each record 3130 may also include a user list 3132 which includes one or more user identifiers 2920. Each user identifier 2920 may correspond to a particular user that is authorized to access the source data 2614 that corresponds to the source data identifier 2622. For example, the source data identifier 2622 may correspond to a URL. The user identifiers 2920 in the user list 3132 may correspond to the users that are authorized to access the web page corresponding to the URL.

Figure 32:
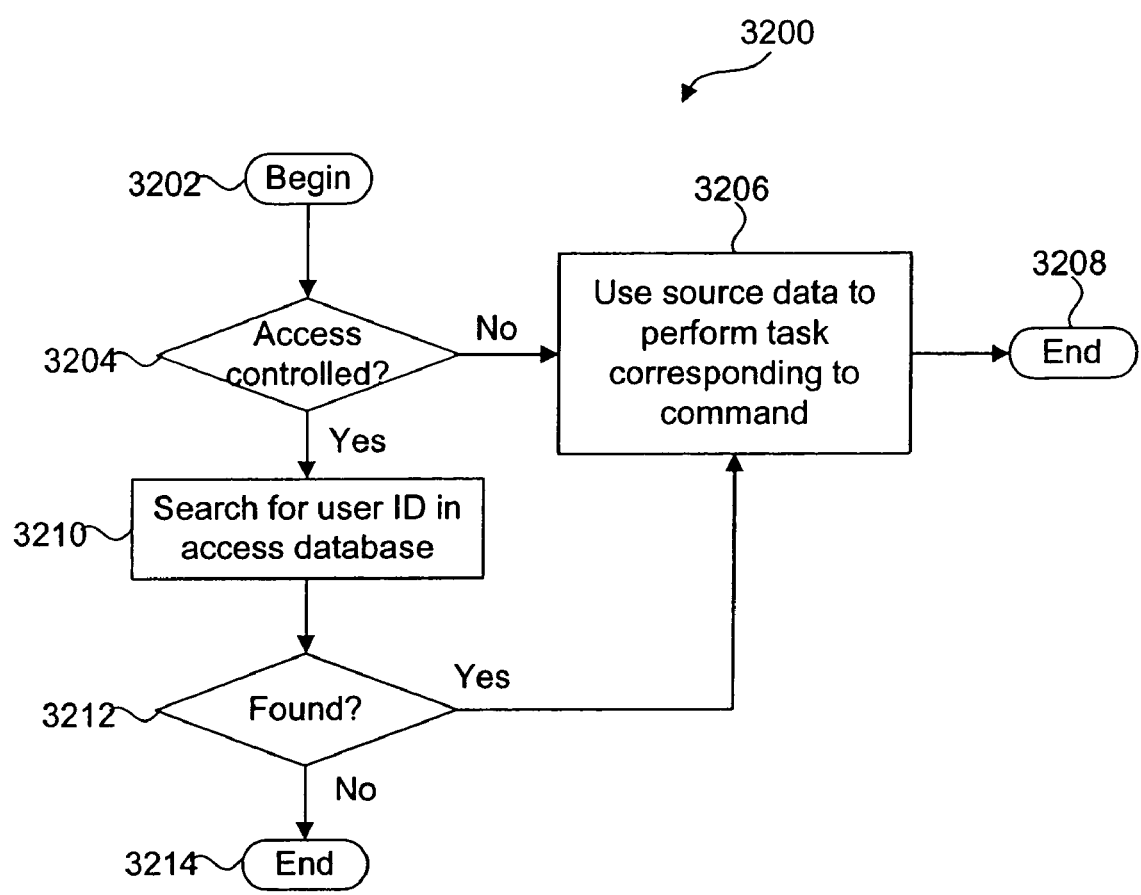
FIG. 32 is a flow diagram of a method for controlling use of the user designated source data.

FIG. 32 is a flow diagram of a method 3200 for controlling use of the user designated source data 2814. The method 3200 begins 3202 by determining 3204 whether the user designated source data 2814 is access controlled. In one embodiment, this may involve determining whether the user designated source data 2814 includes an access control flag 2620. As stated previously, the user designated source data 2814 may include command data that may be recognized by the application 2816 as a command to perform one or more tasks. If it is determined 3204 that the user designated source data 2814 is not access controlled, the user designated source data 2814 may be used 3206 to perform the task corresponding to the command. The method 3200 may then end 3208.

If it is determined 3204 that the user designated source data 2814 is access controlled, the method may then involve searching 3210 for a user identifier 2920 in the access database 2822. If the user identifier 2920 is found 3212 in the access database 2822, the method 3200 may return to step 3206 and proceed as described above. If the user identifier 2920 is not found 3212 in the access database 2822, the method 3200 may end 3214 without performing the task corresponding to the command contained in the user designated source data 2814.

In an alternative embodiment, if the user identifier 2920 is found 3212 in the access database 2822, step 3206 may also include storing authorization information in a local cache 1912. One or more records 3130 from the access database 3122 may be stored in the cache 1912. Specifically, the cache 1912 may include user identifiers 2920 associated with a source data identifier 2622, as well as the relevant authorization periods. In such an embodiment, step 3210 may first involve querying the records 3130 of the access database 3122 stored in the local cache 1912. The cache 1912 is preferably encrypted or signed to prevent the user from modifying the cache.

In another alternative embodiment, the access database 3122 may simply include a list of source data identifiers 2622, without a user list 3132. The source data identifiers 2622 in the access database 3122 may identify the information sources who are authorized to provide source data 114 to the application 216 (or, alternatively, who are not authorized to do so). In such an embodiment, step 3210 may simply involve searching for a specific source data identifier 2622 in the access database 3122.

Figure 33:
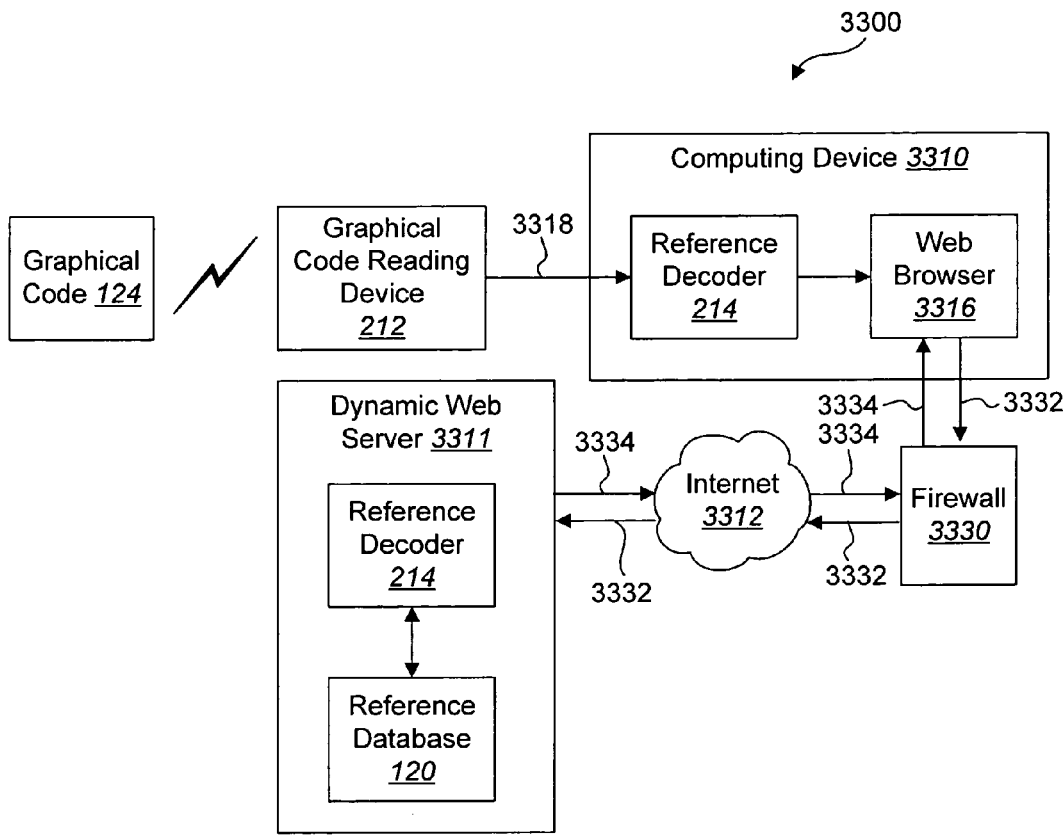
FIG. 33 is a block diagram of an alternative embodiment of a system for decoding machine-readable graphical codes.

FIG. 33 is a block diagram of an alternative embodiment of a system 3300 for decoding machine-readable graphical codes. The system 3300 shown in Figure is 33 similar to the system 400 shown in FIG. 4 except for the following.

In the embodiment shown in FIG. 33, the source data 114 used to create the graphical code 124 is a URL. Thus, the graphical code reading device 212 is configured to read the graphical code 124 and convert it into a reference encoded URL 3318.

The computing device 3310 includes the reference decoder 214. The reference decoder 214 is in electronic communication with a web browser 3316. The web browser 3316 is in electronic communication with a dynamic web server 3311 over the Internet 3312 through a firewall 3330. The firewall 3330 prevents unauthorized users from accessing the dynamic web server 3311. Authorization may be established through, for example, a user name and password. Typically, the web browser 3316 is in possession of the user name and password for the firewall 3330.

The reference decoder 214 accepts the reference encoded URL 3318 and effects conversion of the reference encoded URL 3318 into a URL. In the embodiment shown in FIG. 33, effecting conversion of the reference encoded URL 3318 into a URL involves sending the reference encoded URL 3318 to the web browser 3316. The web browser 3316 includes the reference encoded URL 3318 as part of a file request 3332 that is sent to the dynamic web server 3311. The file request 3332 may be a HTTP request.

The dynamic web server 3311 includes the reference decoder 214 and the reference database 120. By accessing information in the reference database 120, the reference decoder 214 converts the reference encoded URL 3318 contained in the file request 3332 into a URL. The dynamic web server 3311 sends the URL back to the web browser 3316 as part of a redirect web file 3334. The redirect web file 3334 may be an HTML file. After the web browser 3316 receives the redirect web file 3334, the redirect web file 3334 redirects the web browser 3316 to the web page that corresponds to the URL.

Figure 34:
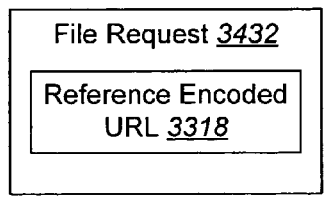
FIG. 34 is a block diagram of an embodiment of a file request.

FIG. 34 is a block diagram of an embodiment of a file request 3432. The file request 3432 includes a reference encoded URL 3318. In one embodiment, the file request 3432 may be an HTTP request, and the reference encoded URL 3318 may be part of a query string contained within the HTTP request.

Figure 35:
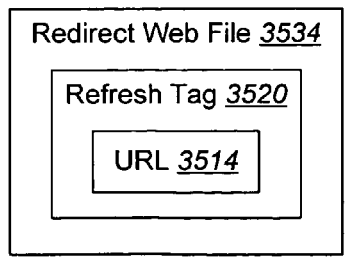
FIG. 35 is a block diagram of an embodiment of a redirect web file.

FIG. 35 is a block diagram of an embodiment of a redirect web file 3534. The redirect web file 3534 may be an HTML file. The redirect web file 3534 or its header includes a redirect or refresh tag 3520, which includes a URL 3514. As stated previously, the reference decoder 214 converts the reference encoded URL 3318 in the file request 3332 into the URL 3514. The redirect or refresh tag 3520 causes the web browser 3316 to access the web page corresponding to the URL 3514.

Figure 36:
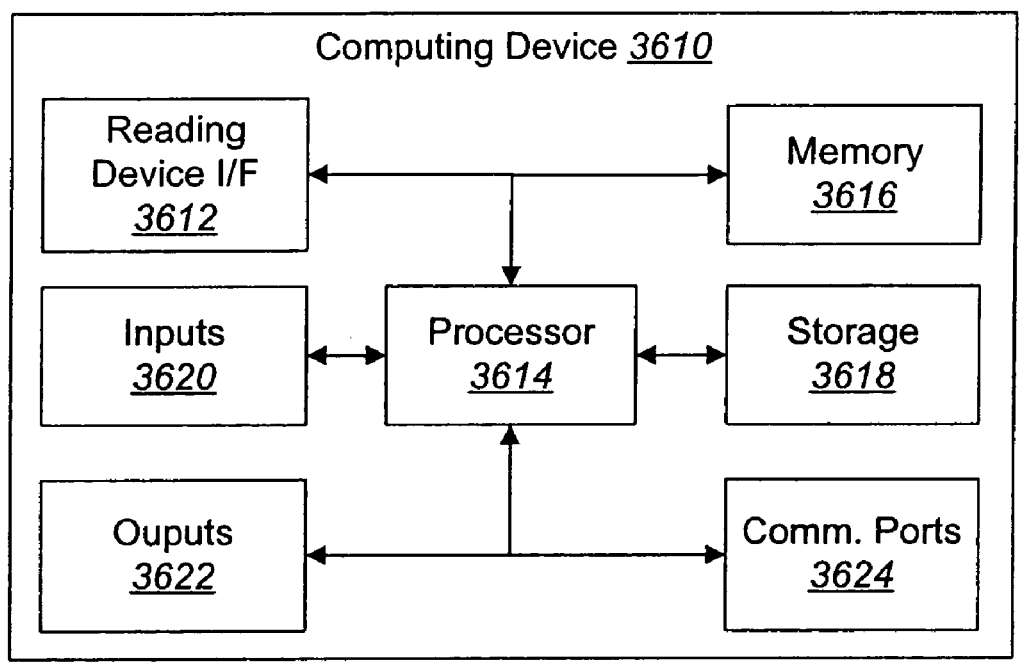
FIG. 36 is a block diagram of hardware components that may be used in an embodiment of a computing device.

FIG. 36 is a block diagram of hardware components that may be used in an embodiment of a computing device 3610. As explained previously, in one embodiment the computing device 3610 is used in combination with the graphical code reading device 212 to read the graphical code 124. In such an embodiment, the computing device 3610 communicates with the graphical code reading device 212 through the reading device interface 3612. The reading device interface 3612 may be a standard communications port typically found on a computing device 3610, or it may be a specialized interface card provided along with the graphical code reading device 212.

Many different types of computer systems may be used to implement the computing device 3610 illustrated herein. The diagram of FIG. 36 illustrates typical components of a computing device 3610 including a processor 3614, memory 3616, a storage device 3618, an input device 3620, and an output device 3622.

One or more communication ports 3624 may also be included in the computing device 3610. It will be appreciated by those skilled in the art that more components may be included in the computing device 3610. For example, several input devices 3620 may be included, such as a keyboard, a mouse, a joystick, a touch screen, etc. In addition, several output devices 3622 may be included such as a monitor, speakers, a printer, etc. Thus, those skilled in the art will appreciate that additional components may be added to the computing device 3610 without detracting from the functionality to serve as a computing device.

The computing device 3610 may be a conventional desktop computer. Desktop computers are commercially available. However, it will be appreciated by those skilled in the art that the computing device 3610 is a broadly defined digital computer. A computing device 3610, as used herein, is any device that includes a digital processor capable of receiving and processing data. A computing device 3610 includes the broad range of digital computers including microcontrollers, handheld computers, personal computers, servers, mainframes, supercomputers, and any variation or related device thereof. In current design, the computing device 3610 is typically an IBM-compatible personal computer running the Linux or Microsoft Windows 95/98/2000 or NT operating system. Of course, other types of computers with different operating systems may be used. For example, an Apple computer or a UNIX workstation may be used as the computing device 3610.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for decoding machine-readable graphical codes, comprising:
   receiving reference encoded source data, the reference encoded source data comprising a first reference identifier and a second portion;
   effecting conversion of the reference encoded source data into source data, the source data comprising first affiliated data in place of the first reference identifier, the source data further comprising the second portion, wherein the first reference identifier is shorter in length than the first affiliated data; and
   making the source data available to a software application.

2. The method of claim 1, wherein effecting conversion of the reference encoded source data into source data comprises:
   locating a reference database that contains the first reference identifier and the first affiliated data; and
   retrieving the first affiliated data from the reference database.

3. The method of claim 2, wherein the first reference identifier and the first affiliated data are associated with a cache period.

4. The method of claim 2, wherein locating the reference database comprises:
   looking for the first reference identifier and the first affiliated data in a first reference database; and
   locating the first reference identifier and the first affiliated data in a second reference database.

5. The method of claim 2, wherein the first affiliated data is dynamically changeable.

6. The method of claim 2, wherein the reference database is stored on a server, and wherein locating the reference database comprises establishing communication with the server over a network.

7. The method of claim 6, wherein the first reference identifier and the first affiliated data are stored in a first record in the reference database, and wherein retrieving the first affiliated data from the reference database comprises downloading the first record from the server.

8. The method of claim 7, further comprising associating an expiration date with the first record.

9. The method of claim 7, wherein the reference database further comprises a second record, the second record comprising a second reference identifier and second affiliated data, the second affiliated data being associated with the second reference identifier, and wherein retrieving the first affiliated data from the reference database further comprises downloading the second record from the server.

10. The method of claim 2, wherein the reference database is stored on a first server and on a second server, and wherein locating the reference database comprises:
    attempting to establish communication with the first server over a network; and
    establishing communication with the second server over the network.

11. The method of claim 1, wherein the first reference identifier does not include a terminating symbol.

12. The method of claim 1, wherein the reference encoded source data comprises a reference encoded URL, wherein the source data comprises a URL, wherein the software application comprises a web browser, and wherein effecting conversion of the reference encoded URL into the URL comprises:
    sending the reference encoded URL to a dynamic web server as part of a file request; and
    receiving a web file from the dynamic web server, the web file comprising the URL, the web file further comprising a refresh tag which causes the web browser to access a web page corresponding to the URL.

13. The method of claim 1, wherein the reference encoded source data further comprises a substitution tag, and further comprising substituting dynamic data for the substitution tag.

14. The method of claim 13, wherein the dynamic data comprises a user identifier.

15. The method of claim 13, wherein the dynamic data comprises a serial number of a graphical code reading device.

16. The method of claim 13, wherein the dynamic data comprises a resolution of a display screen.

17. The method of claim 13, wherein the dynamic data comprises an operating system identifier.

18. The method of claim 13, wherein the dynamic data comprises a CD drive designation.

19. A system for decoding machine-readable graphical codes, comprising:
    a graphical code reading device configured to read a graphical code and generate reference encoded source data, the reference encoded source data comprising a first reference identifier and a second portion; and a computing device in electronic communication with the graphical code reading device, the computing device comprising:
a processor;
a memory in electronic communication with the processor;
a communications port in electronic communication with the processor for communicating with the graphical code reading device;
a reference decoder configured to effect conversion of the reference encoded source data into source data, the source data comprising first affiliated data in place of the first reference identifier, the source data further comprising the second portion, wherein the first reference identifier is shorter in length than the first affiliated data; and
a software application configured to use the source data.

20. The system of claim 19, wherein the reference decoder effects conversion of the reference encoded source data into source data by:
locating a reference database that contains the first reference identifier and the first affiliated data; and
retrieving the first affiliated data from the reference database.

21. The system of claim 20, wherein the first reference identifier and the first affiliated data are associated with a cache period.

22. The system of claim 20, wherein locating the reference database comprises:
looking for the first reference identifier and the first affiliated data in a first reference database; and
locating the first reference identifier and the first affiliated data in a second reference database.

23. The system of claim 20, wherein the first affiliated data is dynamically changeable.

24. The system of claim 20, wherein the reference database is stored on a server, and wherein locating the reference database comprises establishing communication with the server over a network.

25. The system of claim 20, wherein the reference database is stored on a first server and on a second server, and wherein locating the reference database comprises:
attempting to establish communication with the first server over a network; and
establishing communication with the second server over the network.

26. The system of claim 24, wherein the first reference identifier and the first affiliated data are stored in a first record in the reference database, and wherein retrieving the first affiliated data from the reference database comprises downloading the first record from the server.

27. The system of claim 26, wherein the reference decoder is further configured to associate an expiration date with the first record.

28. The system of claim 24, wherein the computing device further comprises a cache in electronic communication with the reference decoder, wherein the first reference identifier and the first affiliated data are stored in a first record in the reference database, and wherein retrieving the first affiliated data from the reference database comprises downloading the first record from the server and storing the first record in the cache.

29. The system of claim 28, wherein the reference database further comprises a second record, the second record comprising a second reference identifier and second affiliated data, the second affiliated data being associated with the second reference identifier, and wherein retrieving the first affiliated data from the reference database further comprises downloading the second record from the server and storing the second record in the cache.

30. The system of claim 20, wherein the reference database is stored on a first server and on a second server, and wherein locating the reference database comprises:
attempting to establish communication with the first server over a network; and
establishing communication with the second server over the network.

31. The system of claim 19, wherein the first reference identifier does not include a terminating symbol.

32. The system of claim 19, wherein the reference encoded source data comprises a reference encoded URL, wherein the source data comprises a URL, wherein the software application comprises a web browser, and wherein the reference decoder effects conversion of the reference encoded URL into the URL by sending the reference encoded URL to the web browser, the web browser being configured to:
send the reference encoded URL to a dynamic web server as part of a file request; and
receive a web file from the dynamic web server, the web file comprising the URL, the web file further comprising a refresh tag which causes the web browser to access a web page corresponding to the URL.

33. The system of claim 19, wherein the reference decoder is contained within the graphical code reading device.

34. The system of claim 19, wherein the reference encoded source data further comprises a substitution tag, and wherein the computing device is configured to substitute dynamic data for the substitution tag.

35. The system of claim 34, wherein the dynamic data comprises a user identifier.

36. The system of claim 34, wherein the dynamic data comprises a serial number of a graphical code reading device.

37. The system of claim 34, wherein the dynamic data comprises a resolution of a display screen.

38. The system of claim 34, wherein the dynamic data comprises an operating system identifier.

39. The system of claim 34, wherein the dynamic data comprises a CD drive designation.

40. A method for decoding a machine-readable graphical code, comprising:
scanning a machine-readable graphical code to create reference encoded source data, the reference encoded source data comprising a reference identifier and an encoded second portion;
converting the reference encoded source data into source data by:
replacing the reference identifier with first affiliated data;
replacing the encoded second portion with an unrecognizable second portion, the unrecognizable second portion being unrecognizable to a graphical code generator used to create the machine-readable graphical code, wherein the encoded second portion comprises a plurality of encoded symbols from a symbol set that may be recognized by the graphical code generator, and wherein replacing the encoded second portion with an unrecognizable second portion comprises:
locating a first reserved symbol in the reference encoded source data, the first reserved symbol indicating a beginning of the encoded second portion; and
decoding each encoded symbol in the encoded second portion; and providing the source data to the software application.

41. A method for decoding a machine-readable graphical code, comprising:
   scanning a machine-readable graphical code to create reference encoded source data, the reference encoded source data comprising a reference identifier and an encoded second portion;
   converting the reference encoded source data into source data by:
      replacing the reference identifier with first affiliated data;
      replacing the encoded second portion with an unrecognizable second portion, the unrecognizable second portion being unrecognizable to a graphical code generator used to create the machine-readable graphical code, wherein the encoded second portion comprises a plurality of encoded symbols from a symbol set that may be recognized by the graphical code generator, and wherein replacing the encoded second portion with an unrecognizable second portion comprises:
         locating a first reserved symbol in the reference encoded source data, the first reserved symbol indicating a beginning of the encoded second portion;
         locating a first width identifier in the reference encoded source data, the first width identifier indicating the number of encoded symbols in the encoded second portion; and
         decoding a number of encoded symbols in the encoded second portion, the number being equal to the first width identifier; and
   providing the source data to the software application.

42. A system for decoding a machine-readable graphical code, comprising:
   a graphical code reading device configured to scan a machine-readable graphical code to create reference encoded source data, the reference encoded source data comprising a reference identifier and an encoded second portion; and
   a computing device in electronic communication with the graphical code reading device, the computing device comprising:
      a processor;
      a memory in electronic communication with the processor;
      a communications port in electronic communication with the processor for communicating with the graphical code reading device;
      a reference decoder configured to convert the reference encoded source data into source data by replacing the reference identifier with first affiliated data and replacing the encoded second portion with an unrecognizable second portion, the unrecognizable second portion being unrecognizable to a graphical code generator used to create the machine-readable graphical code, wherein the encoded second portion comprises a plurality of encoded symbols from a symbol set that may be recognized by the graphical code generator, and wherein replacing the encoded second portion with an unrecognizable second portion comprises:
         locating a first reserved symbol of the plurality of reserved symbols in the reference encoded source data, the first reserved symbol indicating a beginning of the encoded second portion; and
         decoding each encoded symbol in the encoded second portion; and
   a software application configured to receive the source data from the reference decoder.

43. A system for decoding a machine-readable graphical code, comprising:
   a graphical code reading device configured to scan a machine-readable graphical code to create reference encoded source data, the reference encoded source data comprising a reference identifier and an encoded second portion; and
   a computing device in electronic communication with the graphical code reading device, the computing device comprising:
      a processor;
      a memory in electronic communication with the processor;
      a communications port in electronic communication with the processor for communicating with the graphical code reading device;
      a reference decoder configured to convert the reference encoded source data into source data by replacing the reference identifier with first affiliated data and replacing the encoded second portion with an unrecognizable second portion, the unrecognizable second portion being unrecognizable to a graphical code generator used to create the machine-readable graphical code, wherein the encoded second portion comprises a plurality of encoded symbols from a symbol set that may be recognized by the graphical code generator, and wherein replacing the encoded second portion with an unrecognizable second portion comprises:
         locating a first reserved symbol of the plurality of reserved symbols in the reference encoded source data, the first reserved symbol indicating a beginning of the encoded second portion;
         locating a first width identifier in the reference encoded source data, the first width identifier indicating the number of encoded symbols in the encoded second portion; and
         decoding a number of encoded symbols in the encoded second portion, the number being equal to the first width identifier; and
   a software application configured to receive the source data from the reference decoder.

44. A method for decoding a machine-readable graphical code into source data that may be used by a software application, comprising:
   scanning the machine-readable graphical code to create generic source data, the generic source data comprising a substitution tag;
   converting the generic source data into the source data by substituting dynamic data for the substitution tag, wherein the dynamic data is selected from the group consisting of a user identifier, a serial number of a graphical code reading device, a resolution of a display screen, an operating system identifier, and a CD drive designation; and
   making the source data available to the software application.

45. A method for decoding a machine-readable graphical code, comprising:
   scanning a machine-readable graphical code to create alternate encoded source data, the alternate encoded source data comprising an alternate encoded portion;

converting the alternate encoded source data into source data by replacing the alternate encoded portion with an unrecognizable portion, the unrecognizable portion being unrecognizable to a graphical code generator used to create the machine-readable graphical code, wherein the alternate encoded portion comprises a plurality of encoded symbols from a symbol set that may be recognized by the graphical code generator, and wherein replacing the alternate encoded portion with an unrecognizable portion comprises:

locating a first reserved symbol in the alternate encoded source data, the first reserved symbol indicating a beginning of the alternate encoded portion; and decoding each encoded symbol in the alternate encoded portion; and providing the source data to the software application.

* * * * *